US008726399B1

(12) United States Patent
Eshun et al.

(10) Patent No.: US 8,726,399 B1
(45) Date of Patent: *May 13, 2014

(54) METHOD AND APPARATUS FOR THWARTING SPYWARE

(76) Inventors: Kobi O. Eshun, Piedmont, CA (US); Donald W. Mahurin, Mountian View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,596

(22) Filed: Feb. 7, 2012

Related U.S. Application Data

(63) Continuation of application No. 11/657,920, filed on Jan. 24, 2007, now Pat. No. 8,146,164.

(60) Provisional application No. 60/766,506, filed on Jan. 24, 2006.

(51) Int. Cl.

| | | |
|---|---|---|
| G06F 7/04 | (2006.01) | |
| G06F 17/30 | (2006.01) | |
| H04N 7/16 | (2011.01) | |
| H04L 29/06 | (2006.01) | |
| G06F 21/82 | (2013.01) | |
| G06F 21/83 | (2013.01) | |
| G06F 21/60 | (2013.01) | |

(52) U.S. Cl.
CPC ......... *H04L 63/0227* (2013.01); *H04L 63/0245* (2013.01); *H04L 63/1475* (2013.01); *G06F 21/82* (2013.01); *G06F 21/83* (2013.01); *G06F 21/606* (2013.01)
USPC .......................................................... 726/26

(58) Field of Classification Search
CPC ......... G06F 21/82; G06F 21/83; G06F 21/60; G06F 21/606; H04L 63/0281; H04L 63/0227; H04L 63/0245; H04L 63/0471; H04L 63/1475
USPC .......................... 713/189; 726/26, 27; 705/50; 715/224–226
See application file for complete search history.

(56) References Cited

U.S. PATENT DOCUMENTS

| 5,596,718 | A | * | 1/1997 | Boebert et al. .................. 726/16 |
|---|---|---|---|---|
| 2006/0101128 | A1 | * | 5/2006 | Waterson ....................... 709/212 |
| 2007/0245343 | A1 | * | 10/2007 | Shannon et al. ............... 717/174 |

FOREIGN PATENT DOCUMENTS

WO          WO 0110079 A1 * 2/2001

* cited by examiner

*Primary Examiner* — Jeffrey D Popham
*Assistant Examiner* — Daniel Potratz
(74) *Attorney, Agent, or Firm* — Earle Jennings

(57) ABSTRACT

A trusted apparatus including an input filter, security mode indicator working with a proxy node thwart the possibility of spyware being able to observe user input when a security mode signal indicates security mode asserted. The trusted apparatus may further include any combination of the user input device, the proxy node, and a router. A personal computing device may include the trusted apparatus. The proxy node may include the router. The proxy node operates to create an authentic response based upon the authentic input from the input filter, and may be operated to create revenue, which is also a product of these processes.

12 Claims, 19 Drawing Sheets

Fig. 4A
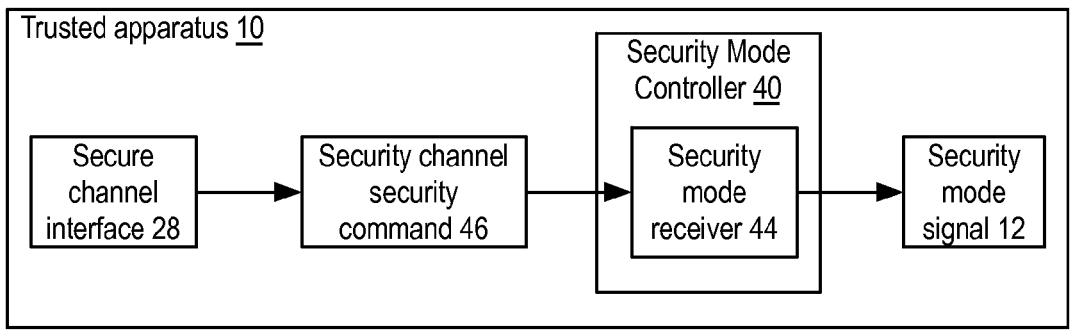
Fig. 4B
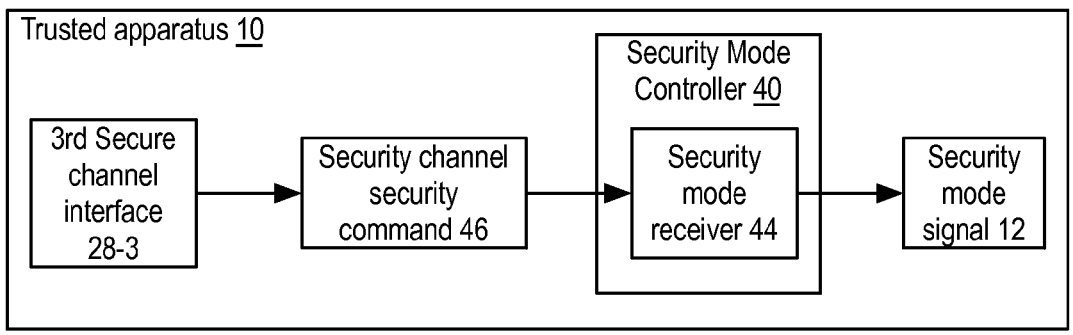
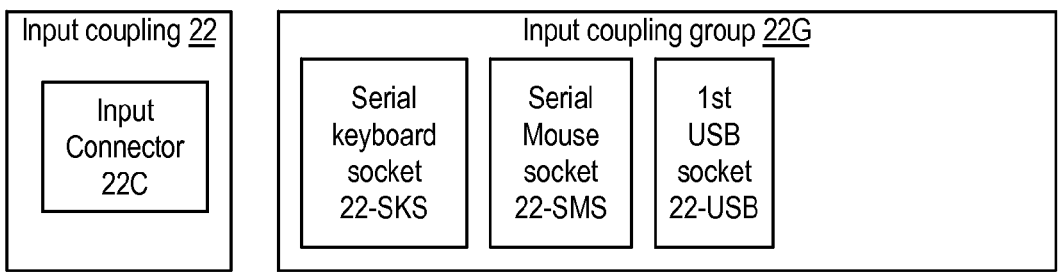
Fig. 4C                           Fig. 4D
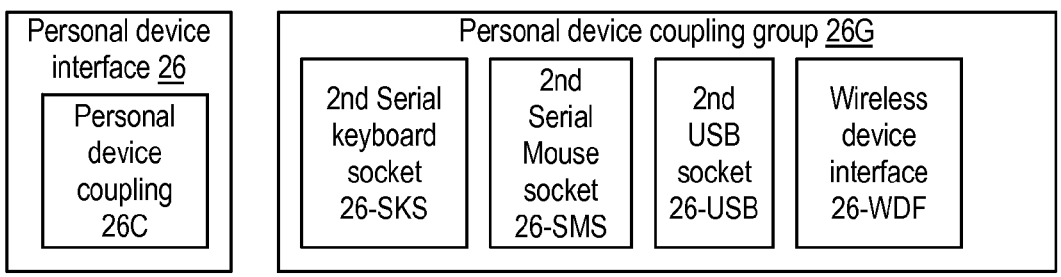
Fig. 4E                           Fig. 4F

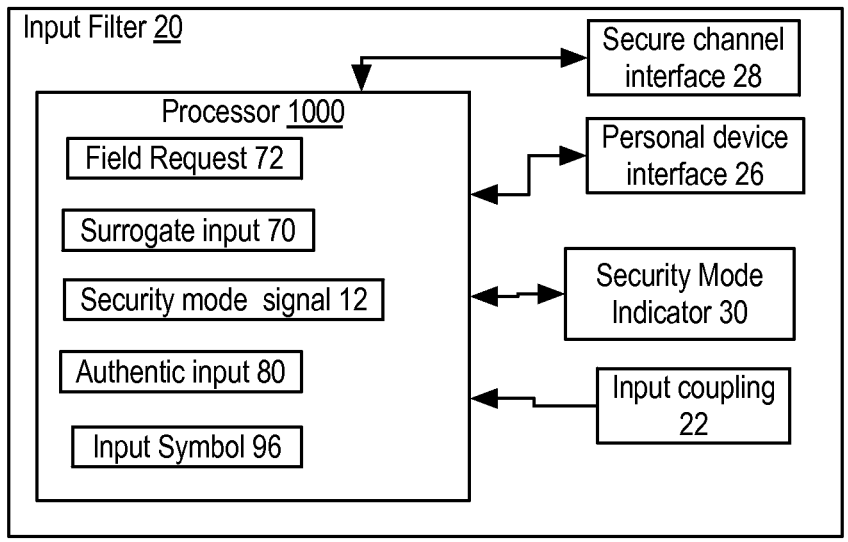
Fig. 6A
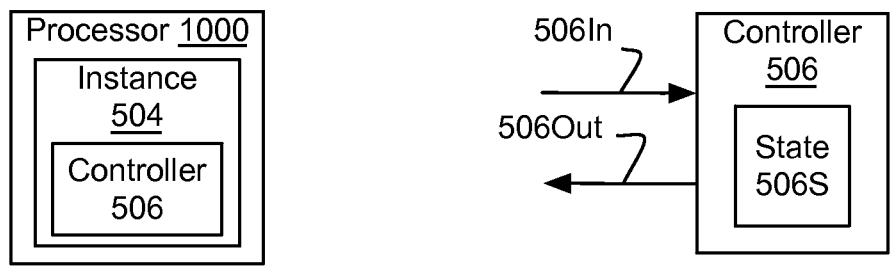
Fig. 6B
Fig. 6C
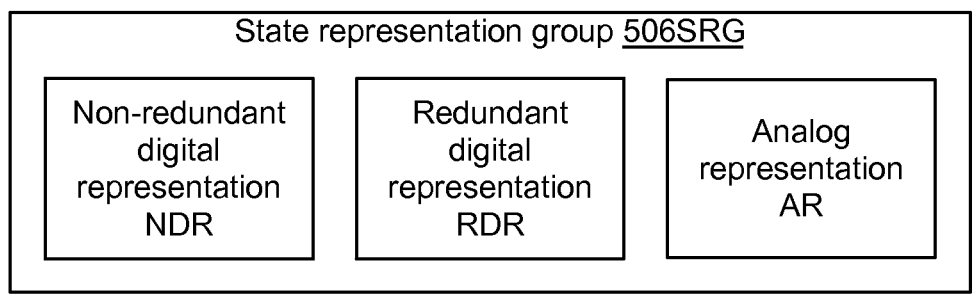
Fig. 6D

METHOD AND APPARATUS FOR THWARTING SPYWARE

CROSS REFERENCE TO RELATED APPLICATIONS

This application is a continuation of U.S. application Ser. No. 11/657,920 filed on Jan. 24, 2007, which claims priority to provisional application Ser. No. 60/766,506, filed Jan. 24, 2006 entitled "METHOD AND DEVICE FOR THWARTING SPYWARE", both disclosures are incorporated herein in their entirety by reference.

TECHNICAL FIELD

This relates to internet computing security, in particular, to insuring that user inputs are safe from unwanted observation, which is also known as spyware.

BACKGROUND OF THE INVENTION

With the ever increasing use of the Internet to transfer information, companies are becoming increasingly dependent on the Internet to practice their business. Web-based transactions have become a primary way of providing access to confidential information. In all situations there is an interest in assuring that the information is received solely by the intended recipient(s) and not diverted to undesired recipients. In the case of business information, there can be substantial sensitivity to unauthorized receipt of the information. In order for businesses to be able to transact their business in confidence that confidential information is not being disseminated beyond the intended recipient, it is necessary that there be provided security measures that prevent others from receiving the information. Also, for individuals, there is their concern that passwords, personal and transactional information be maintained in confidence with the various businesses with which they communicate.

Excellent encryption technologies exist for the purpose of securing private transactions over the public Internet, most notably, Secure Sockets Layer (SSL) Protocol. Common applications include web-based secure transaction processing, such as banking, electronic bill-payment, travel planning, and shopping, to name but a few. In all of these applications, an encrypted channel is established between a web-browser running on a personal computer, and a secure service running at the vendor's data center. The negotiation, establishment, and use of the channel are all automatic and seamless—the only visible token is usually a small padlock icon that appears discreetly on the border of the browser window when the communications link is secure. When the padlock is visible, the web shopper can be sure that a) her network transactions are transmitted and received securely, and that b) they are being exchanged with a trusted agent.

The SSL protocol, built in to all modern web browsers, establishes a protected channel between a personal computer and a server, and automatically and reliably detects a "man-in-the-middle" (MIM) attack. In other words, the protocol can definitively declare that transactions are being received directly by the intended recipient, and not being relayed or modified in transit. But the SSL protocol cannot prevent an intermediary agent from intercepting and relaying those transactions. Of course, any such breach is detected immediately, and results in a strongly-worded warning message from the web browser, along with a recommended option to abort the session.

None of presently available technology addresses a very obvious weak link. Knowing how effective the secured channel is against subversion, the smart intruder does not bother attempting to snoop on the channel. Rather, he eavesdrops on the session at a point before the transaction data are encrypted, by logging all keystrokes typed by the web shopper, using a so called spyware program. No matter how strong the encryption between the web browser and the remote secure server, confidential data entered via a keyboard will always be vulnerable to these keystroke logging programs. And they are ubiquitous: an Internet search for "spyware" yields about 71 million hits, split between programs that log keystrokes and those that purport to detect and remove spyware.

There is, therefore, a need for methods and devices that thwart keystroke logging programs by extending a secured link to the keyboard itself.

As used herein, a proxy server is a network element that performs computing tasks on behalf of a client(s), often a remote secure server, for example, a voice-over-IP media relay or Proxy node server. Other proxy servers are also available commercially. See, for example, U.S. Pat. Nos. 6,981,056 and 6,986,018, which are incorporated herein by reference regarding proxy servers.

SUMMARY OF THE INVENTION

One embodiment of the invention includes a trusted apparatus including at least one input filter, a security mode indicator, both responding to a security mode signal provided by a security mode controller. The input filter, includes:
- at least one input coupling for at least one user input device,
- a personal device interface for providing a surrogate input to a personal computing device after a field request is received either by the input filter or a proxy node, which will be described shortly, from a browser operating on the personal computing device and when the security mode signal indicates the security mode asserted, and
- a secure channel interface for providing the proxy node with at least one authentic input based upon at least one input symbol from at least one of the user input devices while the security mode signal indicates security mode asserted and after the field request is received.

The security mode indicator responds to the security mode signal to at least report when the security mode signal indicates security mode asserted.

A second embodiment of the invention includes the proxy node that receives the authentic input from the input filter and accesses the security mode signal from the trusted apparatus, and includes:
- a second secure channel interface for securely communicating with a secure transaction processor, and
- a second personal device interface for securely communicating with the personal computing device to support a browser on the personal computing device communicating with the secure transaction processor.

The proxy node operates as follows:
The authentic response is generated from the authentic input when the security mode signal indicates the security mode asserted.
The authentic response is sent via the second secure channel interface to the secure transaction processor when the security mode signal indicates the security mode asserted.

A request for the web page is received via the second personal device interface from the browser on the personal computing device and forwarded to the secure transaction processor.

The web page is received via the second secure channel interface based upon the request for the web page.

A version of the web page is sent via the second personal device interface to the browser on the personal computing device.

The version of the web page, also referred to as the web page version, and the authentic response are products of this method of operating the proxy node.

The proxy node may include a router or a IP routing function. It may also include a second trusted package, the first being included in the trusted apparatus, both of which may comparably deter mechanical intrusion attempts.

The method of operating the proxy node may be extended to a method of business, including the operations:

The trusted apparatus logs on using an account and using the second secure channel interface to create an active session.

The proxy node operates within the active session as a service to the trusted apparatus and to the personal computing device.

And the account generates revenue based upon an ability to create the active session.

The revenue is a product of this business process for the proxy node.

As used herein, a secure transaction processor may include but is not limited to any combination of a bank, an electronic bill payment site, a travel planning site, and/or an online shopping site.

As used herein a browser is any application or program system which can operate on a personal computing device and perform at least the following operations:

Request a web page, which is then received and presented for a user. Note that the data for a form will be considered herein to be fetching a web page when the data is requested.

And respond to user inputs to fill in at least one field, which when further requested by the user is sent to the secure transaction processor.

The proxy node positions itself as a trusted Man-In the Middle (MIM) between a browser and the secure transaction processor. It monitors the flow of information during a secure browsing session, and arranges to filter confidential data (such as account passwords) so they never arrive at the personal computer. As noted above, a breach such as this is immediately detectable by the SSL software in the browser. However, the proxy node interacting with the trusted apparatus, in particular the input filter, provide the web shopper sufficient guarantee that the offending MIM is indeed her newly-enhanced keyboard, and convinces her that it is safe to override the warning messages from her browser.

BRIEF DESCRIPTION OF THE DRAWINGS

FIGS. 3C to 4B show various examples of the security mode controller;

FIGS. 4C and 4D show some details of the input coupling of FIG. 1;

FIGS. 4E to 5D show some details of the personal device interface of FIG. 1;

FIGS. 6A to 7F show various aspects of implementations input filter of FIG. 1, including the input filter program system in FIG. 7F, which may be used to understand some aspect of the operations of some embodiments of the input filter shown in the flowcharts of FIGS. 8A to 9B;

DETAILED DESCRIPTION

This application relates to internet computing security, in particular, to insuring that user inputs are safe from unwanted observation, which is also known as spyware.

There are several embodiments of the invention, which may be implemented as separate units, integrated into a single unit, and/or integrated with routers. Various aspects of the invention provide tamper-proof transmission of the input symbols 96, for example, user input keystrokes from a keyboard 92. The devices are used in combination with the Internet and an operating system module 208.

Figure 1:
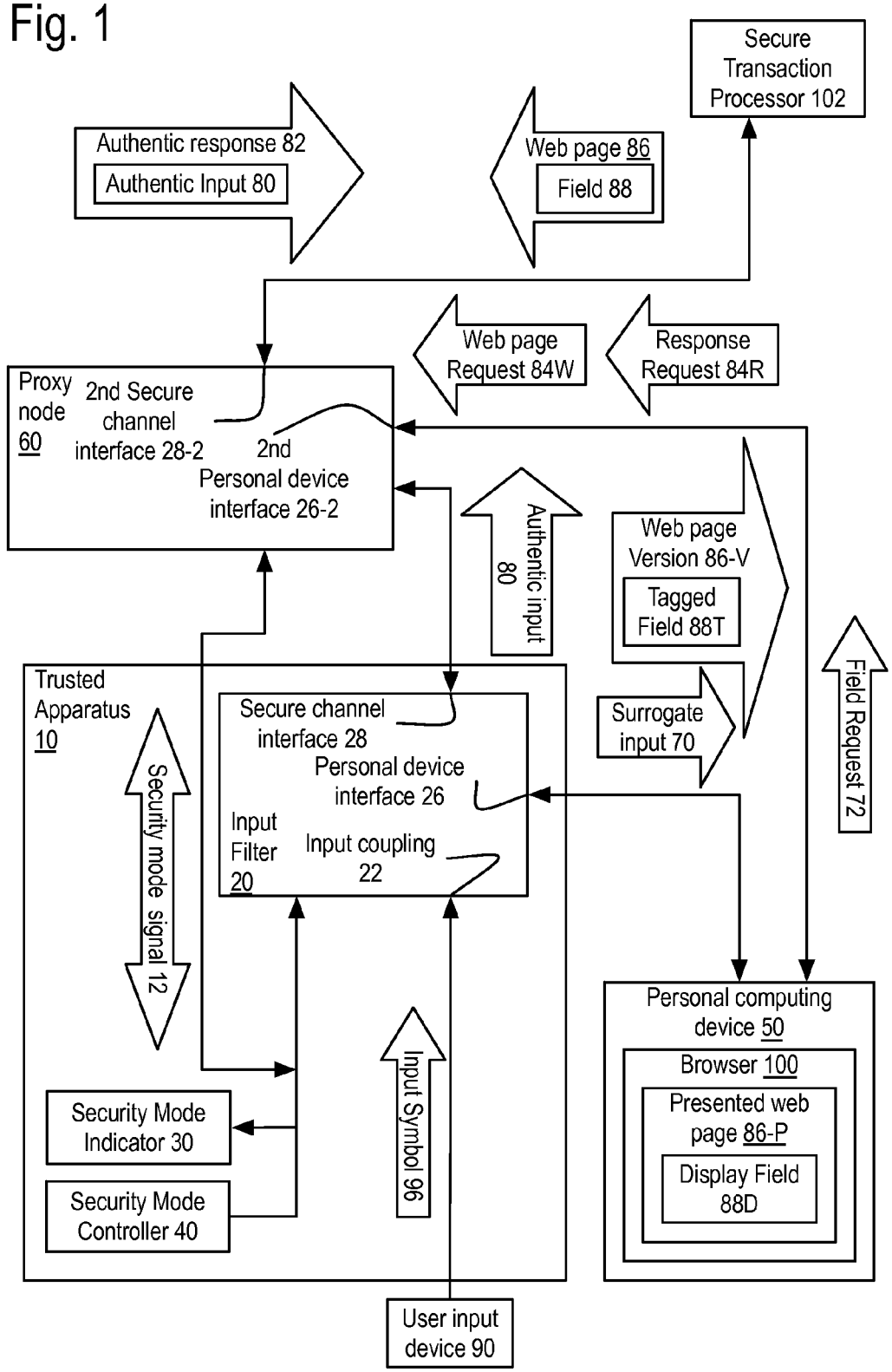
FIG. 1 shows a trusted apparatus including an input filter communicating with a personal computing device through a proxy node with a secure transaction processor in accord with the invention.
Figure 2A:
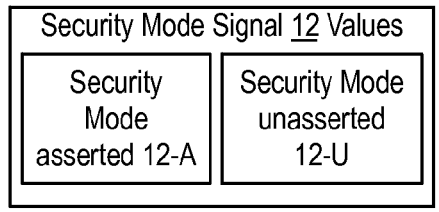
FIG. 2A shows some preferred values for the security mode signal of FIG. 1.

One embodiment of the invention includes a trusted apparatus 10 as shown in FIG. 1 including at least one input filter 20, a security mode indicator 30, both responding to a security mode signal 12 provided by a security mode controller 40. The input filter, includes:

at least one input coupling 22 for at least one user input device 90, a personal device interface 26 for providing a surrogate input 70 to a personal computing device 50 after a field request 72 is received from a browser 100 operating on the personal computing device and when the security mode signal indicates the security mode asserted 12-A, as shown in FIG. 2A, and a secure channel interface 28 for providing a proxy node 60 with at least one authentic input 80 based upon at least one input symbol from at least one of the user input devices while the security mode signal indicates security mode asserted and after the field request received.

The security mode indicator responds to the security mode signal to report when the security mode signal indicates security mode asserted 12-A.

A second embodiment of the invention includes the proxy node 60 that receives the authentic input 80 from the input filter and accesses the security mode signal 12 from the trusted apparatus 10, and includes:

a second secure channel interface 28-2 for securely communicating with a secure transaction processor 102, and a second personal device interface 26-2 for securely communicatively with the personal computing device 50 to support a browser 100 on the personal computing device communicating with the secure transaction processor 102.

The proxy node 60 operates as follows:

An authentic response is generated from the authentic input when the security mode signal indicates the security mode asserted.

The authentic response is sent via the second secure channel interface to the secure transaction processor when the security mode signal indicates the security mode asserted.

There are more operational details, which can be found in the discussion of the flowcharts of FIGS. 12A to 13A.

In many implementations, the security mode signal 12 may assume at least the values of security mode asserted 12-A and security mode unasserted 12-U, as shown in FIG. 2A.

As used herein, a web page 86 will include at least one field 88. These fields may require the user of the personal computing device 50 to activates the display field to enter data for the first authentic input 80 to be part of the authentic response 82. The following operations illustrate some aspects of the invention:

The browser 100 stimulates the personal computing device to send a web page request 84W to the proxy node 60, which in turn passes that request to the secure transaction processor 102.

The secure transaction processor responds to the request by sending a web page 86 containing a field 88 to the proxy node.

The proxy node sends a version of the web page, shown in the figures as the web page version 86-V to the personal computing device, where the browser displays the presented web page 86-P with its display field 88D.

The user activates data capture of the field, causing the browser to send a field request 72 to the input filter 20 via the personal device interface 26.

After the field request has been received and when the security mode signal indicates the security mode asserted, the following operations are performed by the input filter:

An input symbol 96 received from the user input device 90 is altered to create a surrogate input 70, which may be sent via the personal device interface 26 to the personal computing device for use by the browser in the display field.

The input symbol possibly with an indication of which field is activated, is sent as an authentic input 80 to the proxy node 60.

When the user stimulates the browser to send the filled form of the web page 86, the personal computing device sends a response request 84R to the proxy node, which in turn sends an authentic response 82 including the authentic input 80 to the secure transaction processor 102.

All the while, the personal computing device has not had access to that authentic input. No matter how infested the personal computing device is with spyware, there is nothing in the way of authentic data for the spyware to report.

Figure 2B:
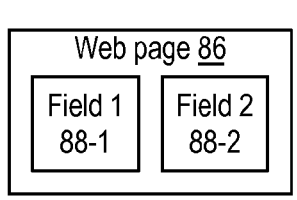
FIGS. 2B to 2E show some details of an example of the web page, web page version, presented web page and the authentic response where the web page has two fill-in fields.
Figure 2C:
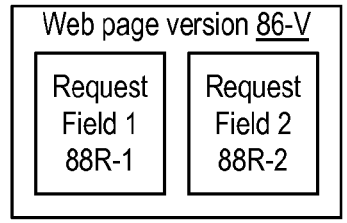
Figure 2D:
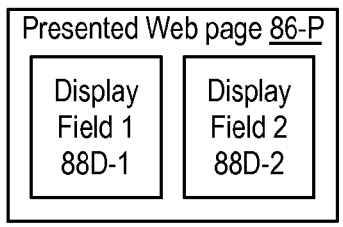
Figure 2E:
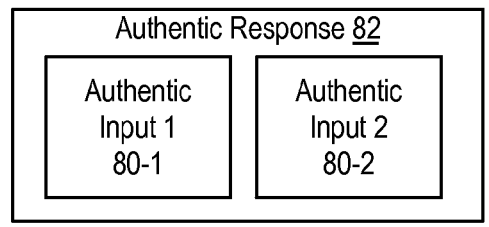

A web page 86 may include more than one field 88, in particular a first field 88-1 and a second field 88-2 as shown in FIG. 2B. Consider this example of a web page with two fields using the FIGS. 2B to 2E with reference to FIG. 1. Assume that the first field 88-1 refers to a user name and the second field 88-2 to a password. The following operations further illustrate some aspects of the invention:

The web page version 86-V now includes a first request field 88R-1 and a second request field 88R-2.

The presented web page 86-P now includes a first display field 88D-1 and a second display field 88D-2.

The authentic response 82 now includes a first authentic input 80-1 and a second authentic input 80-2.

Assume the security mode signal 12 indicates security mode asserted 12-A:

When the user activates the first displayed field, the browser 100 directs the personal computing device 50 to send the field request 72 indicating the first field 88-1 to the input filter 20 via the personal device interface 26, the input symbol 96 is now sent as the first authentic input 80-1.

When the user activates the second displayed field, the field request indicates the second field 88-2. The input filter now sends the input symbols as at least part of the second authentic input 80-2.

Figure 2F:
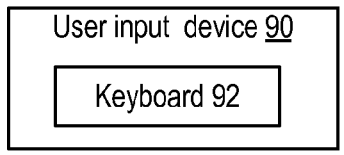
FIG. 2F shows the user input device including a keyboard.
Figure 2G:
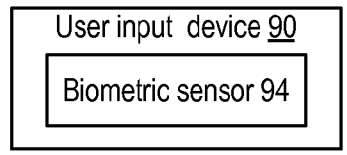
FIG. 2G shows the user input device including a biometric sensor, which may further include any of the members of the biometric sensor group shown in FIG. 2H.

There are many variations and implementations regarding the user input devices:

The user input device 90 may include a keyboard 92, as shown in FIG. 2F and/or include a biometric sensor 94 as shown in FIG. 2G.

Figure 2H:
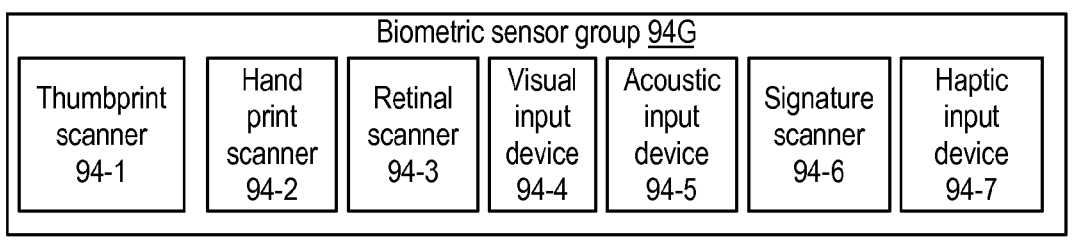

The biometric sensor 94 may include at least one member of the biometric sensor group 94-G, shown in FIG. 2H consisting of: a thumbprint scanner 94-1, a handprint scanner 94-2, a retinal scanner 94-3, a visual input device 94-4, an acoustic input device 94-5, a signature scanner 94-6 and a haptic input device 94-7.

Figure 3A:
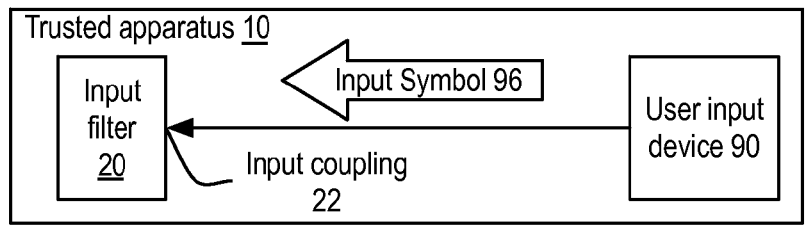
FIG. 3A shows the user input device included in trusted apparatus.

The trusted apparatus 10 may include the user input device 90, as shown in FIG. 3A.

Figure 3B:
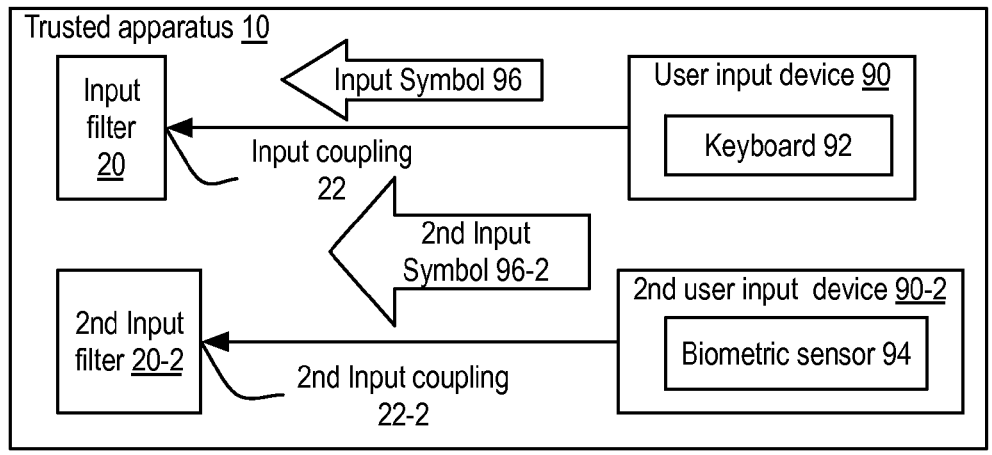
FIG. 3B shows the trusted apparatus two user input devices communicatively coupled to at least partly distinct input filters.

The trusted apparatus 10 may further include a second user input device 90-2 second input coupling 22-2 to the second user input device 90-2, which may include a biometric sensor 94 as shown for example in FIG. 3B. Also in this example the user input device is the keyboard 92. The input coupling and the second input coupling may or may not use the same communication protocols with their respective user input devices.

Figure 3C:
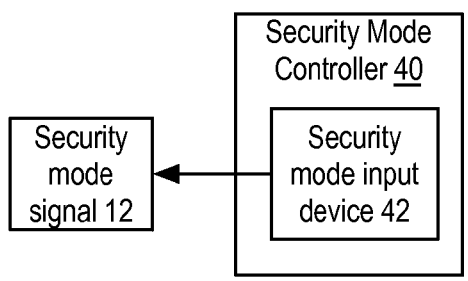
Figure 3D:
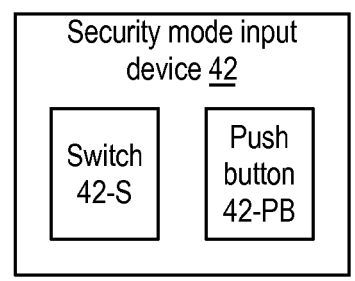

The trusted apparatus 10 may include a variety of security mode controller 40 implementations:

The security mode controller 40 may include a user security mode input device 42 to place the security mode signal 12 into the security mode asserted 12-A, as shown in FIG. 3C. The security mode input device 42 may include at least one switch 42-S and/or at least one push button 42-PB as shown in FIG. 3D.

Figure 3E:
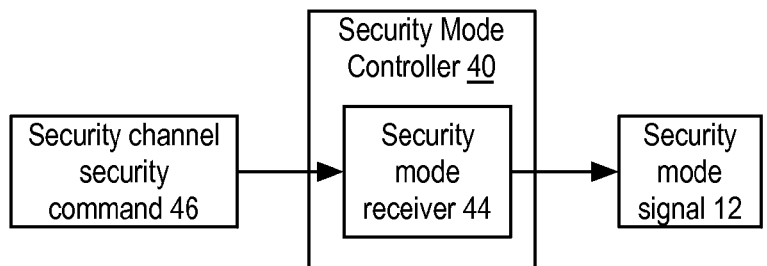

The security mode controller 40 may include a security mode receiver 44 to receive a secure channel security command 46 for at least partially controlling the security mode signal 12, as shown for example in FIG. 3E.

The security mode receiver 44 may be further communicatively coupled to the secure channel interface 26 to receive the secure channel security state message 46.

Note that in certain embodiments, the security mode controller 40 may include both the security mode input device 42 and the security mode receiver 44 as shown in FIG. 4A. It will often be preferred that the security mode signal 12 indicates security mode asserted 12-A when either or both of these assert it.

The security mode receiver 44 may be communicatively coupled to a third secure channel interface 28-3 to receive the secure channel security state message 46 as shown in FIG. 4B.

The input coupling 22 may preferably include at least one input connector 22C, as shown in FIG. 4C.

The input connector 22C may preferably be compatible with a version of at least one member of the input coupling group 22G consisting of the members: a serial keyboard socket 22-SKS, a serial mouse socket 22-SMS, and a first Universal Serial Buss (USB) socket, which will be referred to hereafter as a first USB socket 22-USB, as shown in FIG. 4D.

The personal device interface 26 may preferably include at least one personal device coupling 26C, as shown in FIG. 4E.

The personal device coupling 26C may preferably be compatible with a version of at least one member of the personal device coupling group 26G consisting of the members: a second serial keyboard socket 26-SKS, a second serial mouse socket 26-SMS, a second Universal Serial Buss (USB) socket 26-USB, and a wireless device interface 26-WDF as shown in FIG. 4F.

Figure 5A:
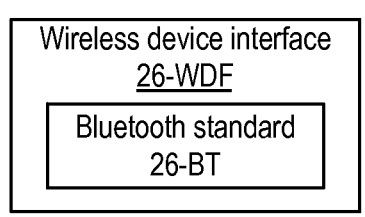
Figure 5B:
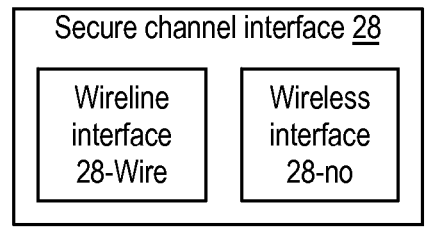

The wireless device interface 26-WDF may preferably be compatible with a version of the Bluetooth standard 26-BT, as shown in FIG. 5A.

The secure channel interface 28 may include at least one instance of a wireline interface 28-Wire and/or a wireless interface 28-no.

Figure 5C:
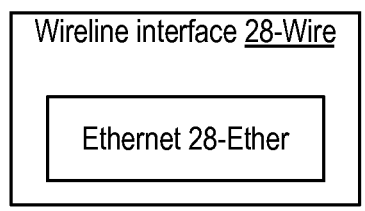

The wireline interface 28-Wire may be compatible with a version of Ethernet 28-Ether, as shown in FIG. 5C.

Figure 5D:
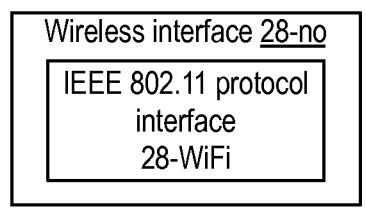

The wireless interface is compatible with at least one version of IEEE 802.11 protocol 28-WiFi, as shown in FIG. 5D.

Figure 5E:
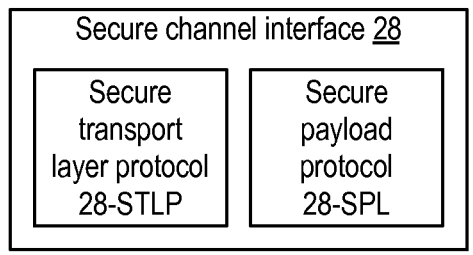
FIGS. 5E to 5G show some details of the secure channel interface and may be used with regards to the second and third secure channel interfaces presented herein.

The secure channel interface 28 supports at least one version of a secure transport layer protocol 28-STLP and a secure payload protocol 28-SPL as shown in FIG. 5E.

Figure 5F:
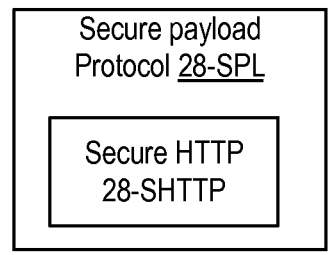
Figure 5G:
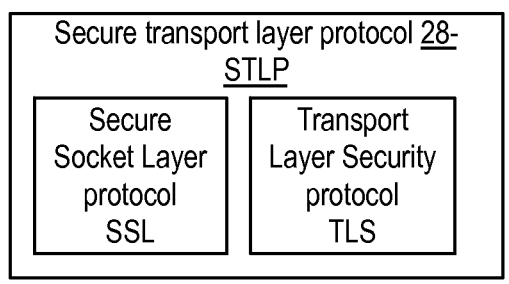

The secure transport layer protocol 28-STLP may include at least one implementation of the Secure Socket Layer protocol SSL and/or the Transport Layer Security Protocol TLS, as shown in FIG. 5G.

The secure payload protocol 28-SPL includes at least one implementation of the Secure HTTP 28-SHTTP, as shown in FIG. 5F.

The input filter 20 may include a processor 1000 communicating via the input coupling 22, at least receiving the security mode signal 12, communicating via the personal device interface 26 and via the secure channel interface 28 as shown in FIG. 6A. The processor may operate as follows:

The input symbol 96 is received via the input coupling from the user.

The field request 72 is received from the personal device interface 26

The surrogate input symbol generated from the input symbol based upon the security mode signal 12 and after the field request is received.

The input symbol and the field request are used to create the authentic input 80 provided to the secure channel interface 28.

As used herein the processor 1000 may preferably include at least one instance 504 of a controller 506, as shown in FIG. 6B. As used herein, each controller receives at least one input 506In, maintains and updates the value at least one state 506S and generates at least one output 506Out based upon at least one of the inputs and/or the value of at least one of the states, as shown in FIG. 6C.

At least one state 506S may have a value including at least one member of the state representation group 506SRG consisting of the members: a non-redundant digital representation NDR and/or a redundant digital representation RDR and/or an analog representation AR, as shown in FIG. 6D:

A non-redundant digital representation frequently comprises at least one digit, which may frequently represent a bit with values of 0 and 1, a byte including eight bits, and so on. Often non-redundant digital representations include representations of 16 bit integers, 32 bit integers, 16 bit floating point numbers, 32 bit floating point numbers, 64 bit floating point numbers, strings of bytes, fixed length buffers of bytes, integers, First-In-First-Out (FIFO) queues of such representations, and so on. Any, all and more than just these examples may be used as non-redundant digital representations of the state of a controller.

Figure 7A:
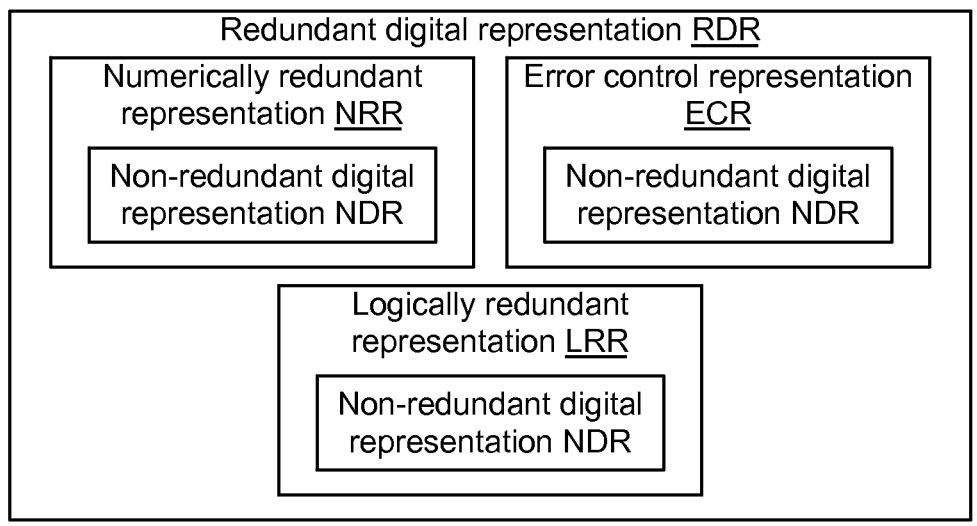

A redundant digital representation RDR of a non-redundant digital representation NDR may include a numerically redundant digital representation NRR, an error control representation ECR and/or a logically redundant representation LRR, as shown in FIG. 7A. The following examples will serve to illustrate these redundant representations:

An example of a numerically redundant representation NRR may be found in a standard multiplier, which will often use a local carry propagate adder to add three or four numbers together to generate two numeric components which redundantly represent the numeric result of the addition.

An example of an error control representation ECR will frequently use the non-redundant digital representation and an additional component formed as the function of the non-redundant digital representation. If this error control representation is altered by a few number of bits, a error correcting function reconstructs the original non-redundant digital representation. Quantum computers are considered as controllers which will tend to use this kind of error control representations for at least some states.

An example of a logically redundant representation LRR may be found in the definition and implementation of many finite state machines, which often require that a single state be represented by any member of a multi-element set of non-redundant digital representation. Often the members of this set differ from at least one other member of the set by just one bit. Such logically redundant representations are often used to insure that the generation of glitches is minimized.

Figure 7B:
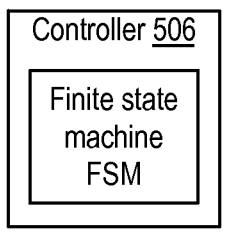
Figure 7C:
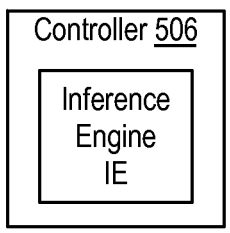
Figure 7D:
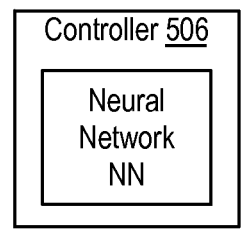
Figure 7E:
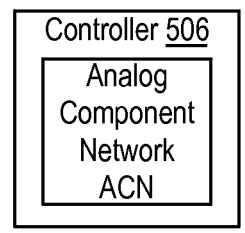
Figure 7F:
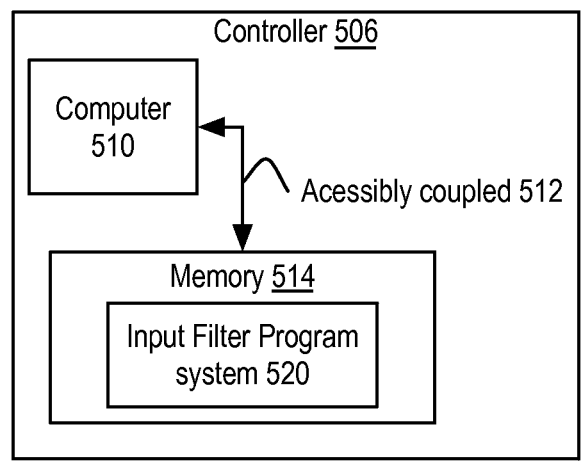

As used herein, the controller 506 may include an instance of a finite state machine FSM as shown in FIG. 7B, and/or include an instance of an inference engine 7C as shown in FIG. 8F and/or an instance of a neural network NN as shown in FIG. 7D and/or an instance of an analog component network ACN as shown in FIG. 7E and/or an instance of a computer 510 directed by a program system 520 including program steps or operations residing in a memory 514 accessibly coupled 512 to the computer as shown in FIG. 7F.

As used herein, a computer includes at least one instruction processor and at least one data processor, where each of the data processors is directed by at least one of the instruction processors.

In what follows, at least one flowchart will be shown to illustrate an example of at least some aspects of this method. The operation of starting a flowchart refers to at least one of the following and is denoted by an oval with the text "Start" in it:
  Entering a subroutine in a macro instruction sequence in a computer 510.
  Entering into a deeper node of an inferential graph of an inference engine IE.
  Directing a state transition in a finite state machine FSM, possibly while pushing a return state.
  And triggering at least one neuron in a neural network NN The operation of termination in a flowchart refers to at least one of the following and is denoted by an oval with the text "Exit" in it:
  The completion of those steps, which may result in a subroutine return in the computer 510.
  Traversal of a higher node in an inferential graph of the inference engine IE.
  Popping of a previously stored state in the finite state machine FSM.
  Return to dormancy of the firing neurons of the neural network NN An operation in a flowchart refers to at least one of the following:
  The instruction processor responds to the step as a program step to control the data execution unit in at least partly implementing the step within the computer 510.
  The inference engine IE responds to the step as nodes and transitions within an inferential graph based upon and modifying a inference database in at least partly implementing the step.
  The neural network NN responds to the step as stimulus in at least partly implementing the step.
  The finite state machine FSM responds to the step as at least one member of a finite state collection comprising a state and a state transition, implementing at least part of the step.

Figure 8A:
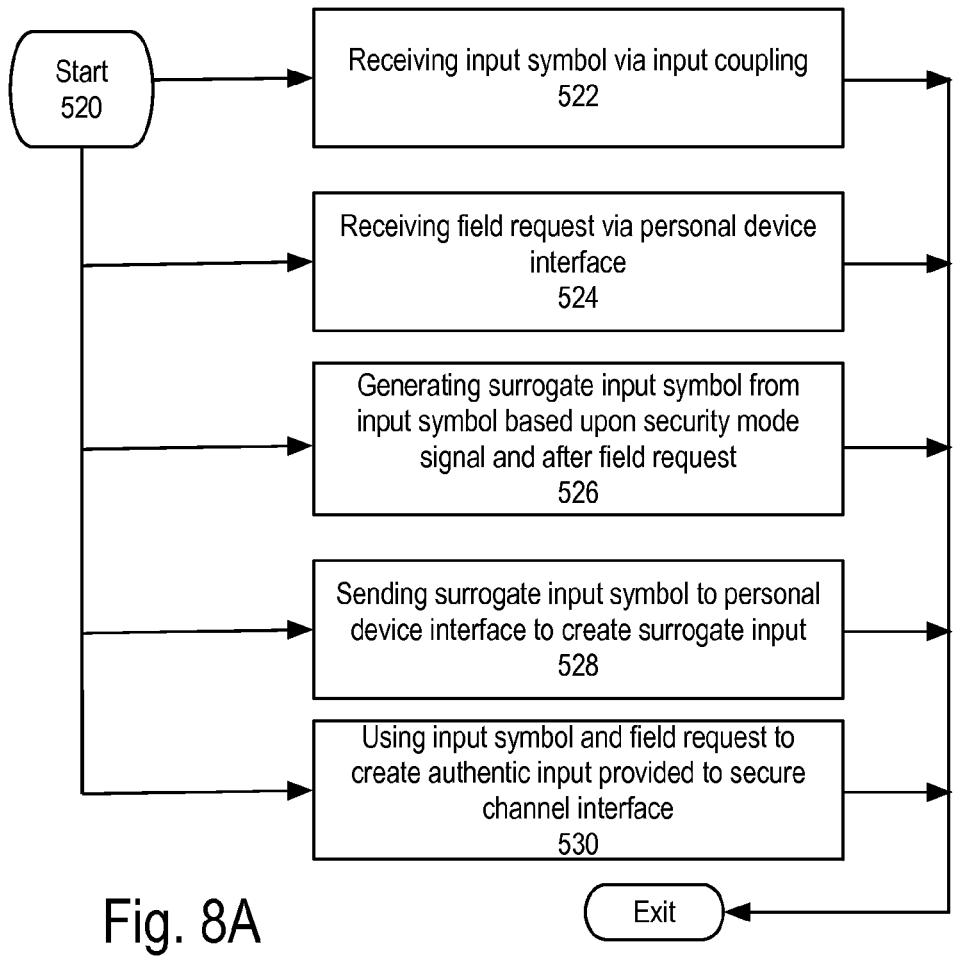

The input filter program system 520 of FIG. 7F may include any combination of the program steps or operations of FIG. 8A:
  Operation 522 supports receiving the input symbol via the input coupling
  Operation 524 supports receiving the field request from the personal device interface
  Operation 526 supports generating the surrogate input symbol from the input symbol based upon the security mode signal and after the field request is received
  Operation 528 supports sending the surrogate input symbol to the personal device interface to create the surrogate input.
  And operation 530 supports using the input symbol and the field request to create the authentic input provided to the secure channel interface.

Figure 8B:
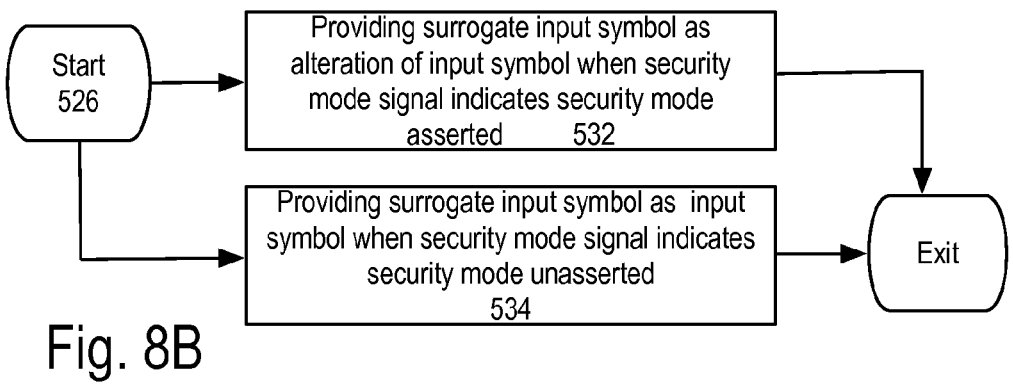

Operation 526, generating the surrogate input symbol, may further include the operations of FIG. 8B:
  Operation 532 supports providing a surrogate input symbol for an alteration of the input symbol when the security mode input indicates the security mode asserted. Note that in some embodiments, the alteration may include removing the input symbol, so that no surrogate is created or sent to the personal device interface. In other embodiments, a constant character, such as "*" or "X" may be the alteration.
  And operation 534 supports generating the surrogate input symbol as the input symbol when the security mode input indicates the security mode unasserted. When the security mode is unasserted, the input filter preferably acts as a flow through device.

Figure 9A:
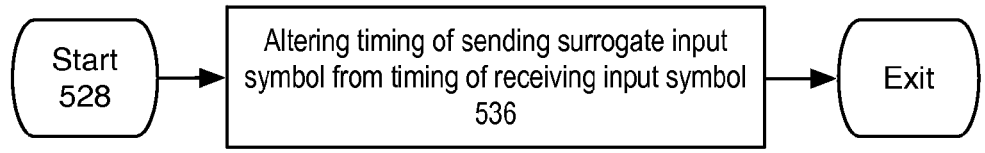
FIG. 9C shows the trusted apparatus including a trusted package being acted upon by a mechanical intrusion attempt.
FIG. 9D shows some details of the security mode indicator of FIG. 1.

Operation 528, sending the surrogate input symbol, may further include the operations of FIG. 9A:
  Operation 536 supports altering the timing of sending the surrogate input symbol from the timing of receiving the input symbol.

Figure 9B:
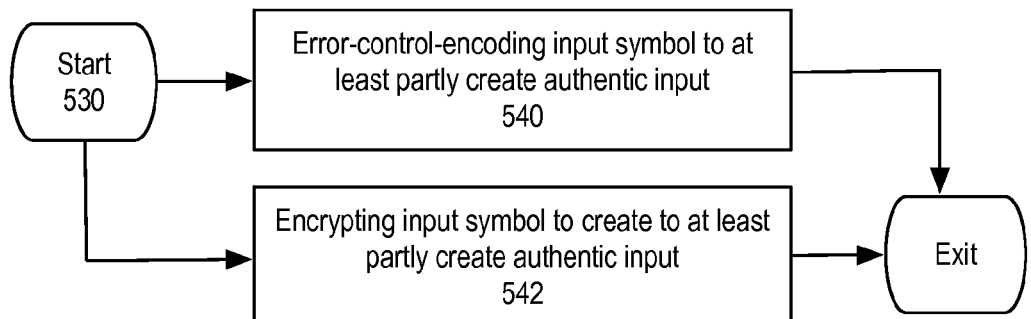
Figure 9C:
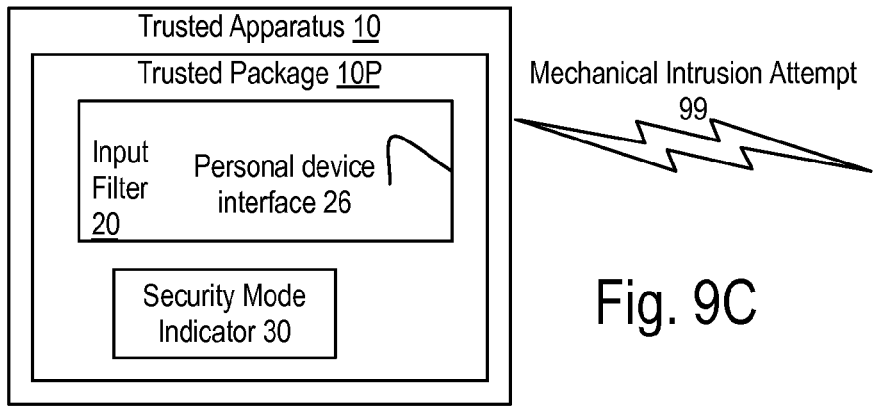
Figure 9D:
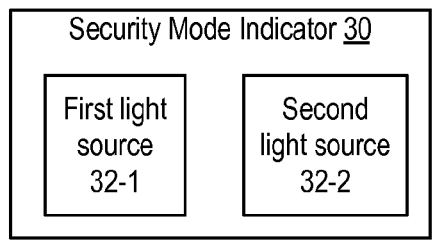

Operation 530, creating the authentic input, may further include any combination of the operations of FIG. 9B:
  Operation 540 supports error-control-encoding the input symbol to at least partly create the authentic input.
  And operation 542 supports encrypting the input symbol to at least partly create the authentic input.

The trusted apparatus 10 may further include a trusted package 10P which deters a mechanical intrusion attempt 99, and encloses the input filter 20, the security mode indicator 30 and providing the personal devices interface 26. The trusted package may provide this deterrence in any of several ways:
  The trusted package may change color after the mechanical intrusion attempt.
  The trusted package may shatter from the mechanical intrusion attempt.
  The trusted package may report the mechanical intrusion attempt.

In reporting the mechanical intrusion attempt, the personal device interface and/or the security mode indicator may be used.
  The security mode indicator 30 may include a first light source 32-1 to report the security mode signal 12 indicating security mode asserted 12-A, and a second light source 32-2 to report preferably that there has been a mechanical intrusion attempt 99.

The trusted apparatus 10 and/or its processor 1000 may measure a physical parameter of the trusted package 10P to determine whether the mechanical intrusion attempt 99 has occurred.

Figure 10A:
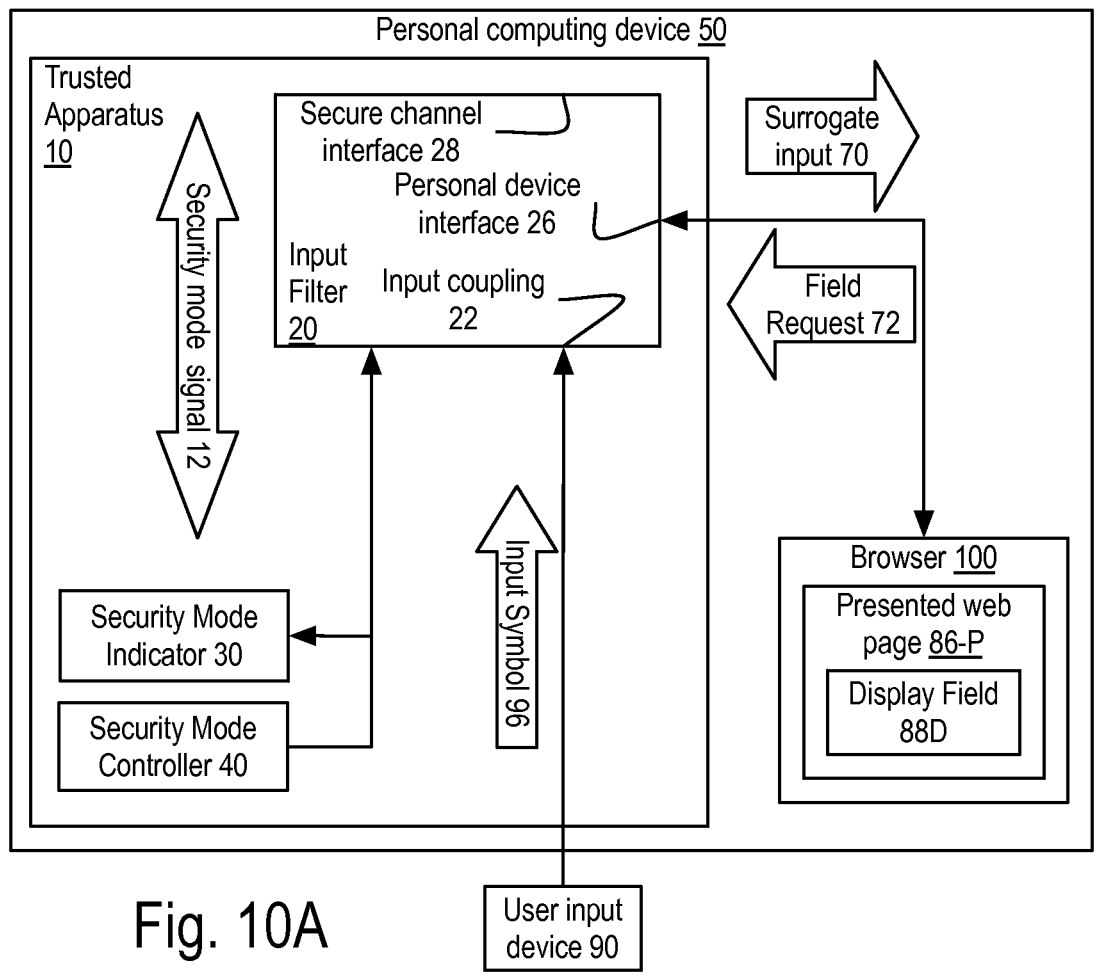
FIG. 10A shows a personal computing device including the trusted apparatus.
Figure 10B:
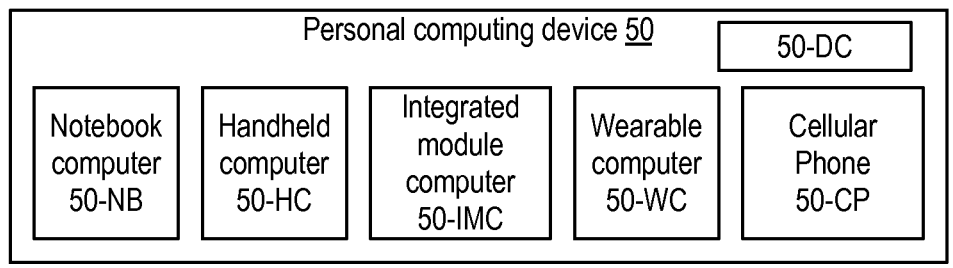
FIG. 10B shows some examples of elements which may be included in the personal computing device as used herein.

The personal computing device 50 may include the trusted apparatus 10, as shown in FIG. 10A. The personal device interface 26 may communicatively couple to the browser 100 for the communication of the field request 72 and the surrogate input 70.
  The personal computing device 50, may include an instance of a notebook computer 50-NB and/or a handheld computer 50-HC and/or an integrated module computer 50-IMC and/or a desktop computer 50-DC and/or a wearable computer 50-WC and/or a cellular phone 50-CP, as shown in FIG. 10B.

Figure 11A:
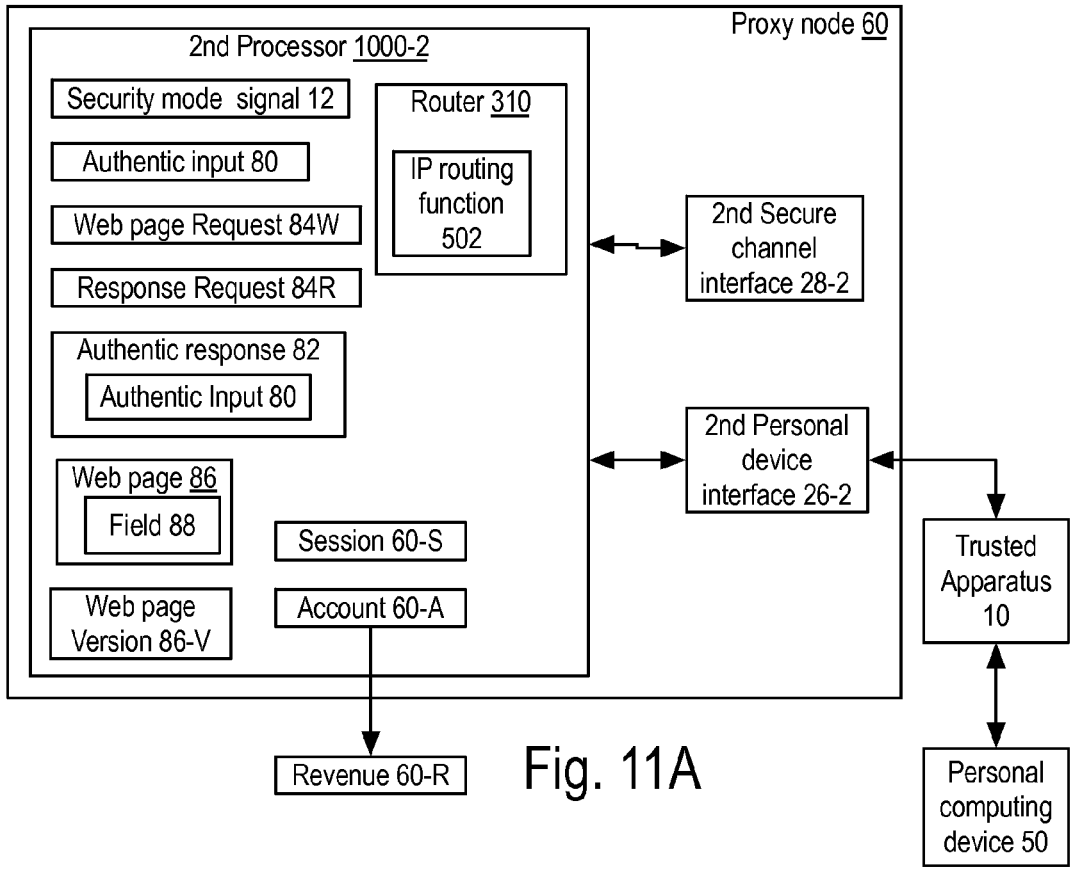
FIGS. 11A to 11C show some implementation details of the proxy node including a proxy node program system in FIG. 11C, which is further detailed in the flowcharts of FIGS. 12 to 13B.
Figure 11B:
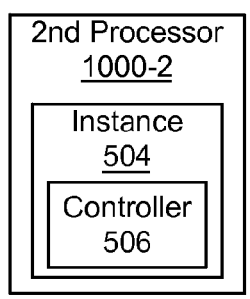

Now returning to the discussion of the proxy node 60 of FIG. 1, the proxy node may include a second processor 1000-2 communicatively coupled to the second secure channel interface 28-2 and communicatively coupled to the second personal device interface coupling 26-2, as shown in FIG. 11A.
  As before, the second processor 1000-2 may include at least one instance 504 of the controller 506, where each controller receives at least one input 506In, maintains and updates the value of at least one state 506S and generates at least one output 506Out based upon at least one of the inputs and/or the value of at least one of the states, as shown in FIG. 11B.

Figure 11C:
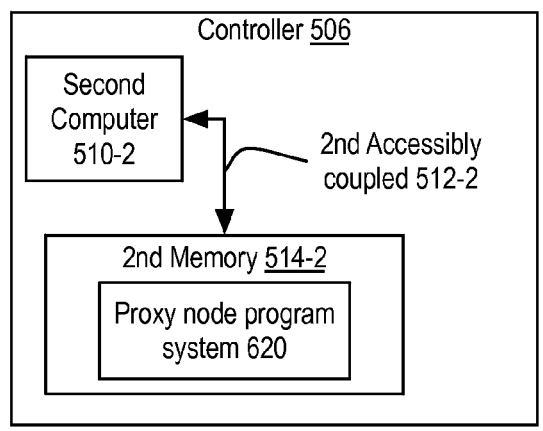

The discussion of the controllers is essentially the same as before, except that these controllers may include a second computer 510-2 second accessibly coupled 512-2 to a second memory and at least partially directed by a proxy node program system 620 including at least one program step residing in the second memory as shown in FIG. 11C.

The proxy node 60 may include a router 310, further the router may preferably be implemented as an IP routing function 502 within by the second processor in certain embodiments, as shown in FIG. 11A.

Figure 12A:
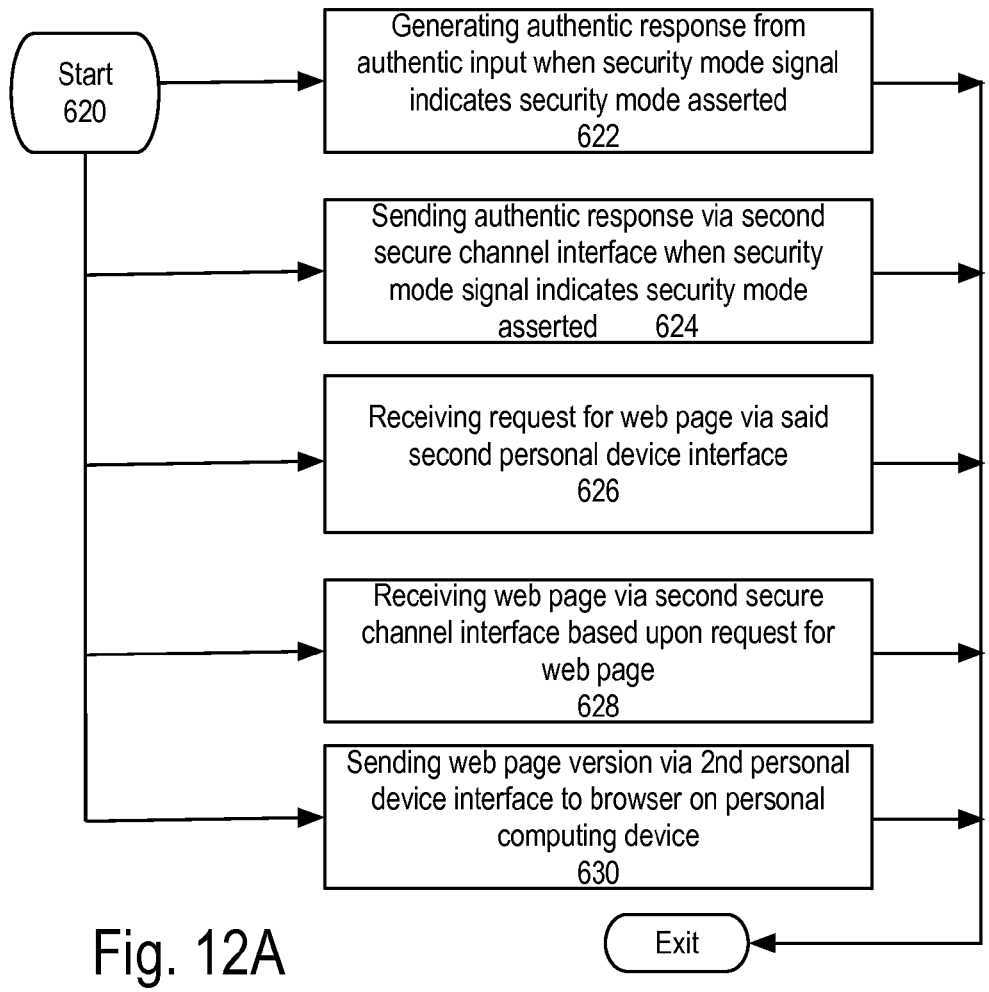

The method of operating the proxy node 60 may be seen through example by considering the proxy node program system 620 of 11C, which may include any combination of the operations of FIG. 12A:

Operation 622 supports generating the authentic response from the authentic input when the security mode signal indicates the security mode asserted.

Operation 624 supports sending the authentic response via the second secure channel interface to the secure transaction processor when the security mode signal indicates the security mode asserted.

Operation 626 supports receiving the request for the web page via the second personal device interface from the browser on the personal computing device.

Operation 628 supports receiving the web page via the second secure channel interface based upon the request for the web page.

Operation 630 supports sending the version of the web page via the second personal device interface to the browser on the personal computing device.

The version of the web page 86, also referred to as the web page version 86-V, and the authentic response 82 are products of this method of operating the proxy node.

Figure 12B:
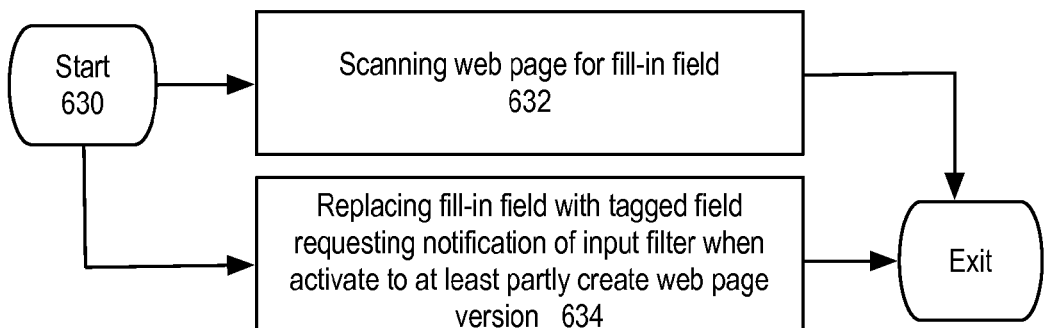

Operation 630 of FIG. 12A, sending the version of the web page, may further include the operations of FIG. 12B:

Operation 632 supports scanning the web page 86 for a fill-in field 88.

And operation 634 supports replacing the fill-in field with a tagged field 88T requesting notification of the input filter 20 when activated to at least partly create the web page version 86-V.

Note that when the fill-in field 88 is deactivated, the input filter and/or the proxy node are notified to stop filling in the field with the authentic input which differs from the surrogate input.

Figure 13A:
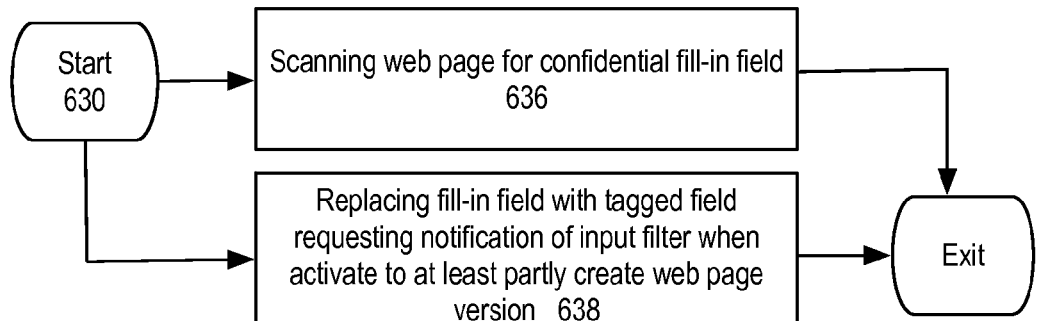
FIG. 13C shows some elements which may be included in the secure transaction processor.

Operation 634 of FIG. 12B, replacing the fill-in field, may further include the operations of FIG. 13A:

Operation 636 supports determining if the fill-in field 88 is confidential.

And operation 638 supports replacing the fill-in field with the tagged field 88T when the fill-in field is the confidential.

Figure 13B:
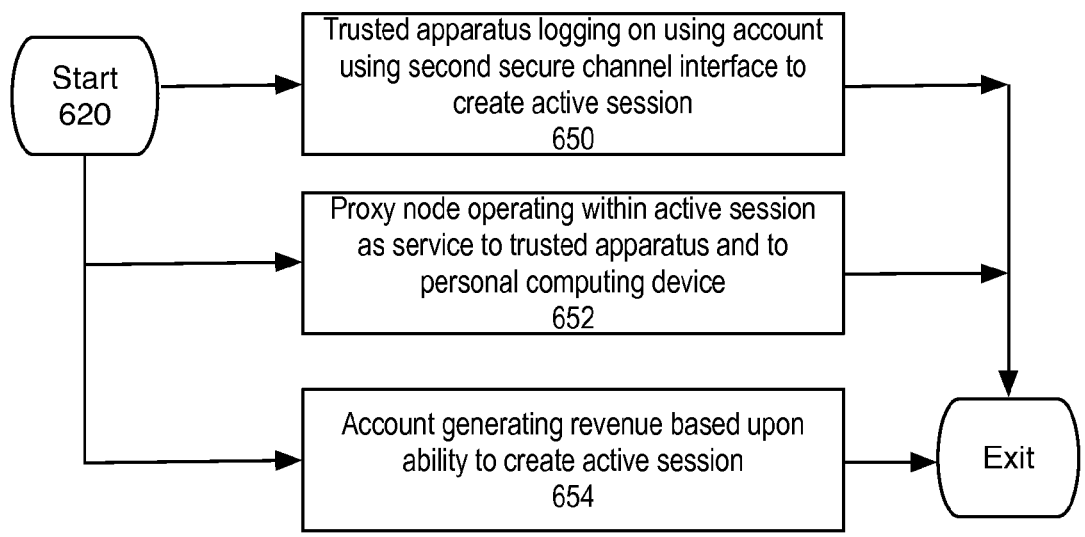

The method of operating the proxy node 60 may be extended to a method of business, which can be shown as an extension to the proxy node program system 620 in FIG. 13B:

Operation 650 supports the trusted apparatus 10 logging on using an account 60-A as in FIG. 11A, using the second secure channel interface 28-2 to create an active session 60-S.

Operation 652 supports the proxy node operating within the active session as a service to the trusted apparatus and to the personal computing device 50.

Operation 654 supports the account generating a revenue 60-R based upon an ability to create the active session.

Figure 13C:
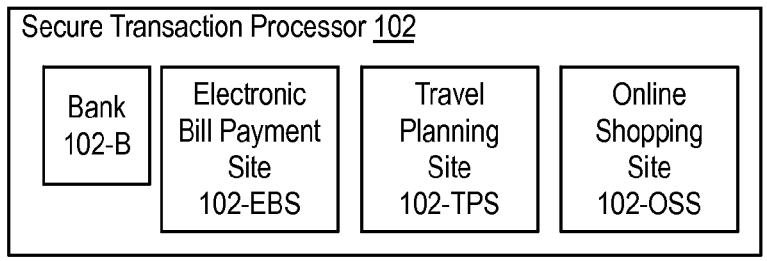

As used herein, a secure transaction processor 102 may include but is not limited to any combination of a bank 102-P, an electronic bill payment site 102-EBS, a travel planning site 102-TPS, and an online shopping site 102-OSS, as shown in FIG. 13C.

The proxy node 60 inserts itself between the web browser 100 and a secure transaction processor 102 and/or the intended recipient of the communication. The browser detects the presence of the proxy node between the browser and the intended recipient. The browser will then issue a warning that there is a breach or a "man in the middle". The proxy server will then provide a reassurance, either directly or indirectly, that the breach is acceptable by providing an indication or means for signaling, such as a visual display or audio message, that it is the proxy node that is being detected by the browser. That is, confirming that the operation is secure. Conveniently, a light source 32 in the security mode indicator 30 may be illuminated showing that the proxy node is involved.

The user configures their network application, for example, the browser 102, to direct requests to the proxy node 60. Software can be provided that automatically does the configuring or the configuring can be done manually. For example, the configuration can direct HTTPS requests to the proxy node.

In certain embodiments of the invention, during operation of the trusted apparatus 10, the user may connect to a secure transaction processor 102 over a version of the Internet. The secure transaction processor may act as a secure remote server. The proxy node 60 modifies a document, or web page 86 presented by the secure transaction processor requiring user input. The proxy node 60 augments the document in such a way that whenever a secured input is required, the browser generates a message to the proxy node signaling that secure input is required. Upon the proxy node receiving the message that the input is required to be secure, the proxy node preferably transmits a command to the input filter 20 to suppress transmission of the input to the operating system 106 and the browser 100. Instead of the input going to the personal computing device 50 and its operating system, the input may go directly to the proxy node perhaps after a delay or at the proxy nodes request.

The input filter 20 may be software, represented in FIGS. 8A to 9B, that acts to permit or suppress the transmission of the input symbol 96 to the personal computing device 50 and the operating system 106 and the driver 208. Normally, the input filter would permit the transmission. However, when commanded by the proxy node 60 not to transmit to the operating system 106, it sends the input to the proxy node, for example, using an SSL connection. The input filter can also serve to provide an indication of the security status of the session. In the case of keystroke input, the input filter will provide a surrogate input 70 of the input symbol 96, for example, keystrokes different from the actual keystrokes received from a keyboard 92. To avoid any ability to recognize patterns of keystroke entry, the input filter may normalize or randomize the rate of transmission of keystrokes. For other inputs, analogous surrogates may be used.

A version of an Internet connection may be employed to establish a secured connection to the secure transaction processor 102. When the proxy node 60 is not physically located in the same housing as the input filter 20, the proxy node may use the secure channel interface 28 as an Internet connection to communicate with the input filter.

The operating system 106 driver 208 injects inputs, e.g. keystrokes, into the operating system as required. The software mimics the behavior of a conventional device driver.

This software can also be responsible for establishing an Internet connection over the USB cable for some configurations.

Figure 14:
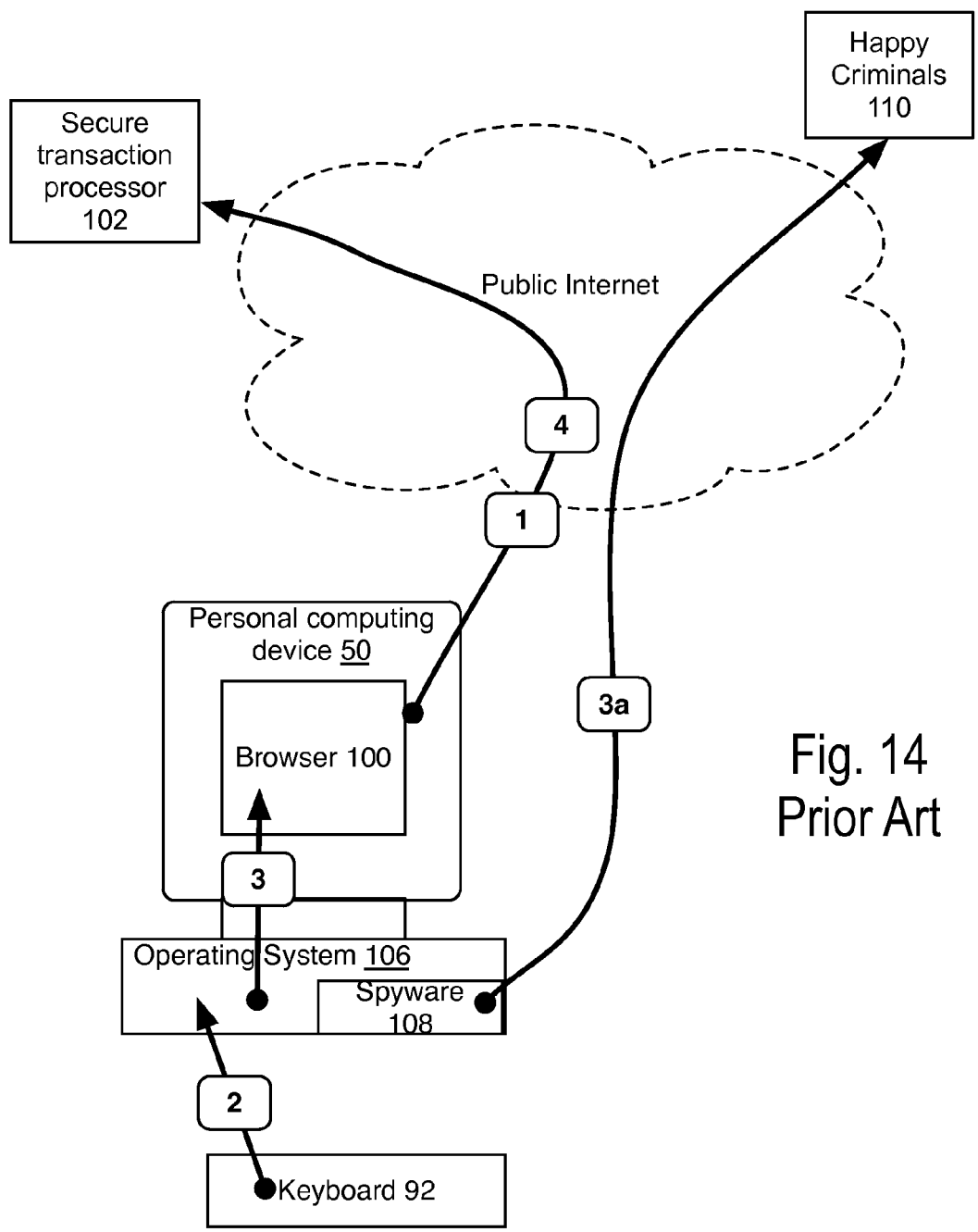
FIG. 14 shows an example of the prior art for conducting a "secure" web session.

Consider the typical, "secured" web browsing session of the prior art depicted in FIG. 14. Following the system, in step 1 a browser 100 connects securely to a secure transaction processor's website. In step 2 confidential data are entered at the keyboard 92 and sent to the computer operating system 106. In step 3, the computer operating system 106 forwards the confidential data to the browser 100, but in step 3a spyware 108 intercepts the confidential data and forwards it clandestinely to an unauthorized website 110. In step 4, the browser 100 securely encrypts the confidential data and forwards them to the secure transaction processor 102, which may serve as a website. Note that the keystrokes coming from the keyboard 92 in step 2 must pass through the operating system 106 software of the personal computer before arriving at the browser 100. By the time the browser 100 transmits the encrypted data in step 4 to the secure transaction processor 102, the spyware program 108 has already intercepted the keystrokes as they traversed the operating system, and has covertly transmitted them in step 3a to some site for harvesting.

Figure 15:
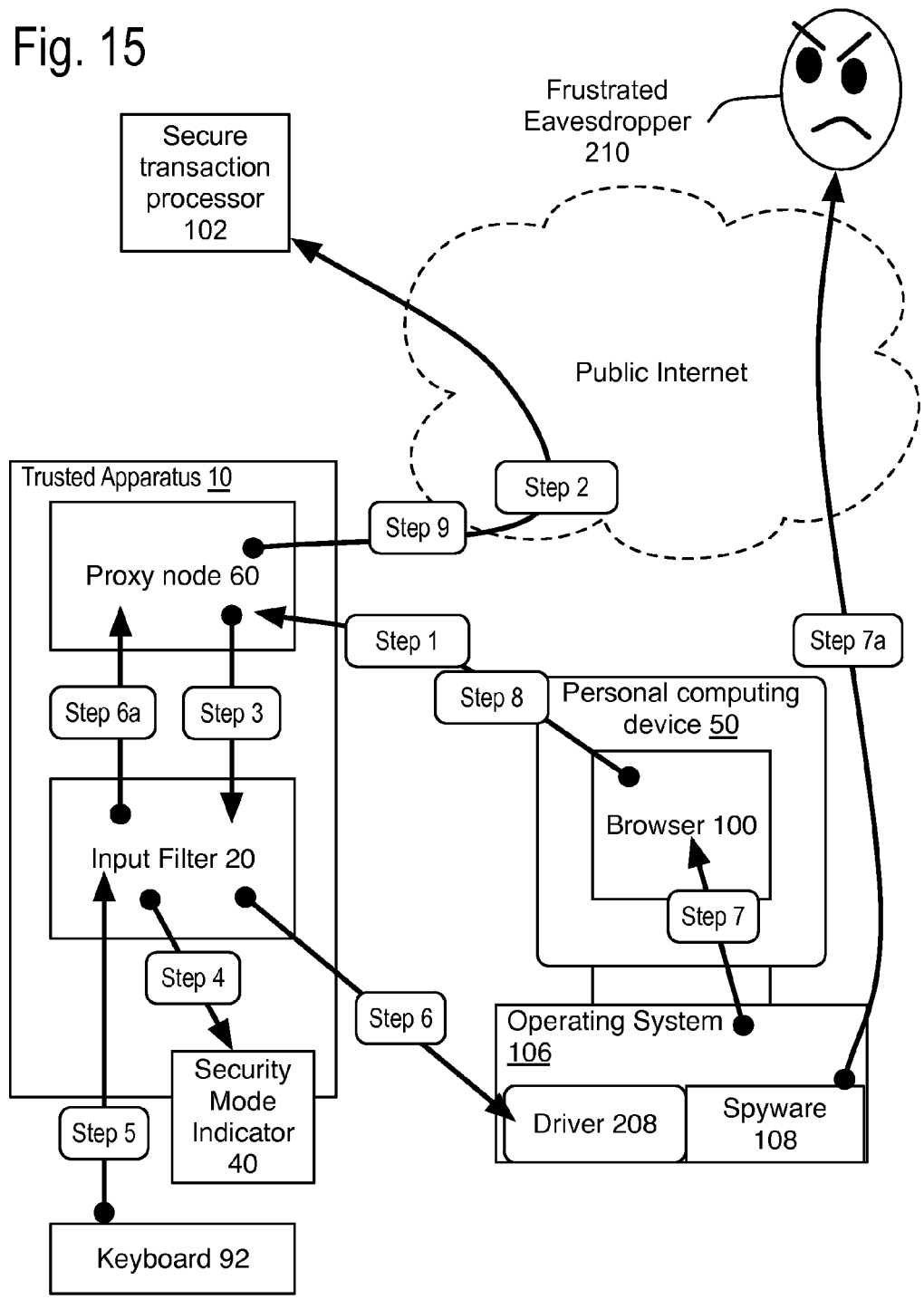
FIGS. 15 to 18 show examples of conducting a secure web session in accord with aspects of the invention, in particular, the trusted apparatus including the proxy node.

In FIG. 15, a trusted apparatus 10 including the proxy node 60 is placed between a user input device 90, in particular, a keyboard 92 and a personal computing device 50. The device also has its own connection to the Internet. This time the browser 100 has established a protected channel to the trusted apparatus 10 in step 1, rather than to the secure transaction processor 102 directly; the trusted apparatus in turn has established a protected channel to the secure transaction processor in step 2. While the trusted apparatus is arranging to intercept the secured connection, it may illuminate an indicator light preferably located security mode indicator 40, and perhaps displays some confirmation text on the trusted apparatus. In this way, a user such as a web shopper is assured that the trusted apparatus is indeed responsible for the breach reported by the browser 100.

The proxy node 60 may preferably automatically detect when confidential data fields are being edited by the browser 100, and it signals the input filter 20 to suppress normal transmission in step 3. While transmission is suppressed, the input filter preferably activates a Status Light security mode indicator that the security mode signal indicate security mode asserted 12-A in step 4 to provide a positive, visual cue that it is safe to type in confidential information from the Keyboard 92 in step 5. The input filter 20 forwards innocuous asterisks or dots to the driver 208 in step 6, and passes the confidential data directly to the proxy node 60 in step 6a.

The driver 208 module may act to inject the scrubbed keystrokes into the operating system 106, and the operating system 106 delivers them to the browser 100 in step 7. As before, the spyware module 108 intercepts the keystrokes as they traverse the operating system 106, but this time they have no harvest value as shown in step 7a, where the attempted eavesdropper 210 is frustrated. In order to receive or send confidential data to the secure transaction processor 102, the secure transaction processor provides a form to be filled out. When the confidential data is submitted via the trusted apparatus 10 to the secure transaction processor 102 in step 8, the proxy node 60 inserts the confidential keystrokes where they belong in the form, and relays the completed form to the secure transaction processor 102 in step 9.

As described above, the trusted apparatus 10 may be packaged as a self-contained "dongle" device that is installed between a user input device 90, such as a keyboard 92 and the personal computing device 50 with its own connection to the Internet.

Figure 16:
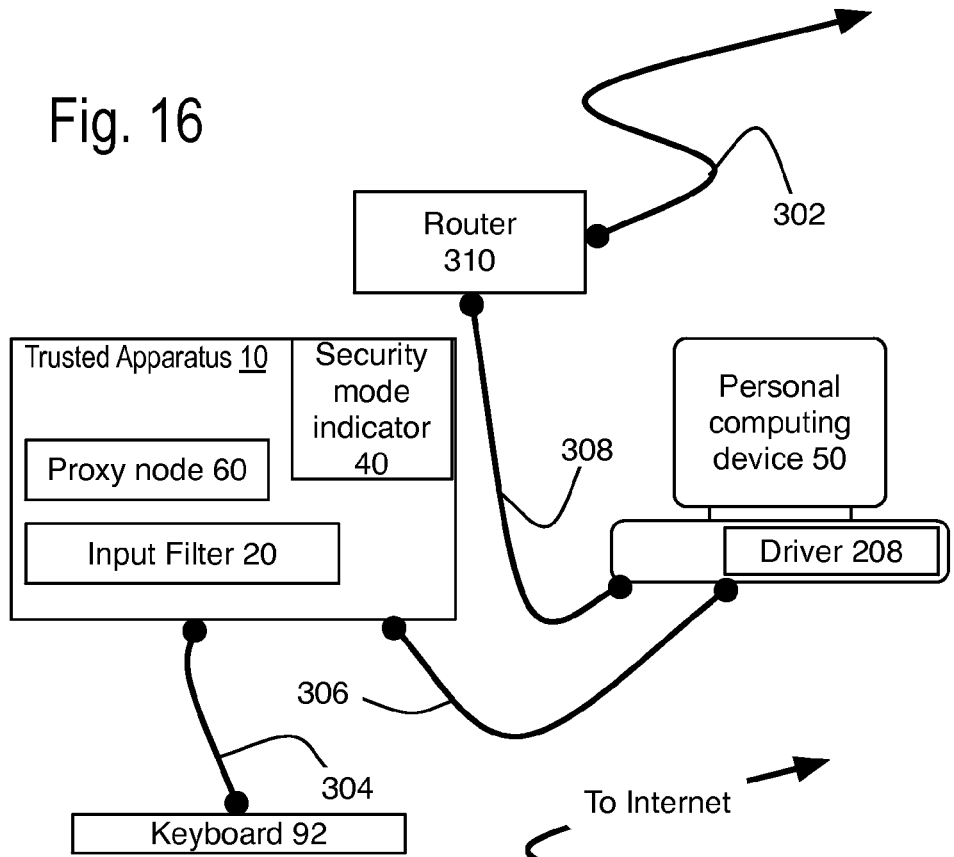

The configuration in FIG. 16 is perhaps the most straightforward to describe. All of the trusted apparatus 10 components are packaged in a single, USB-based "dongle," that is installed between a standard USB keyboard and a computer. It draws power from the USB port of the personal computing device 50, and multiplexes an Internet connection 302 over that same port. The in-line dongle trusted apparatus 10 could also include a FLASH disk containing installation software for the operating system Driver 208, making it completely self-contained. In this configuration, the keyboard 92 is connected by the USB connection 304 to the trusted apparatus 10, while the trusted apparatus is connected to the personal computing device 50 by USB connection. The personal computing device 50 may be connected to the Internet by Local area network connection 308 optionally through router 310.

Figure 17:
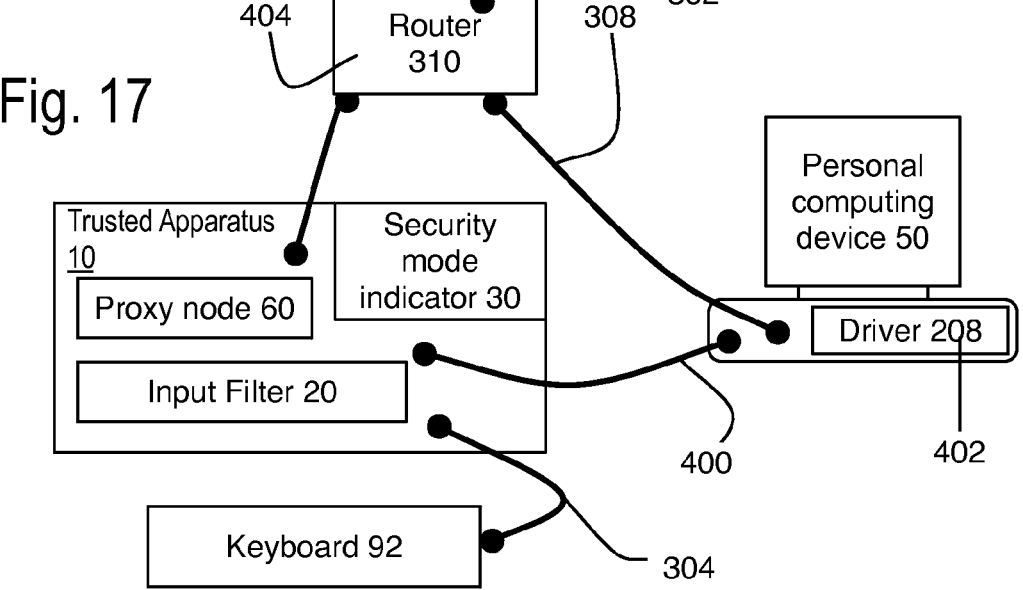

Rather than multiplexing an Internet connection over the USB cable, the configuration In FIG. 17 has its own dedicated Second local area network connection 404, either wired or wireless. The keystrokes are sent over the Second local area network connection 404 sent to the personal computing device 50 via the Second local area network connection 404, the router 310 and the Local area network connection 308. The various parts and their interactions are as described in FIG. 16, where the same numbers as used to designate the components. If the optional USB connection 400 may be present, then the Input filter 20 will forward keys over optional USB connection 400, as before. Otherwise, the keystrokes will be routed to the Driver Module 208 via the Local area network connection 308, effectively transforming the keyboard 92 into a network appliance. The Driver Module 402 in this case includes a mechanism for securely establishing network connectivity with the correct keyboard 92 and trusted apparatus 10. Such an arrangement might prove useful for remote administration applications.

Figure 18:
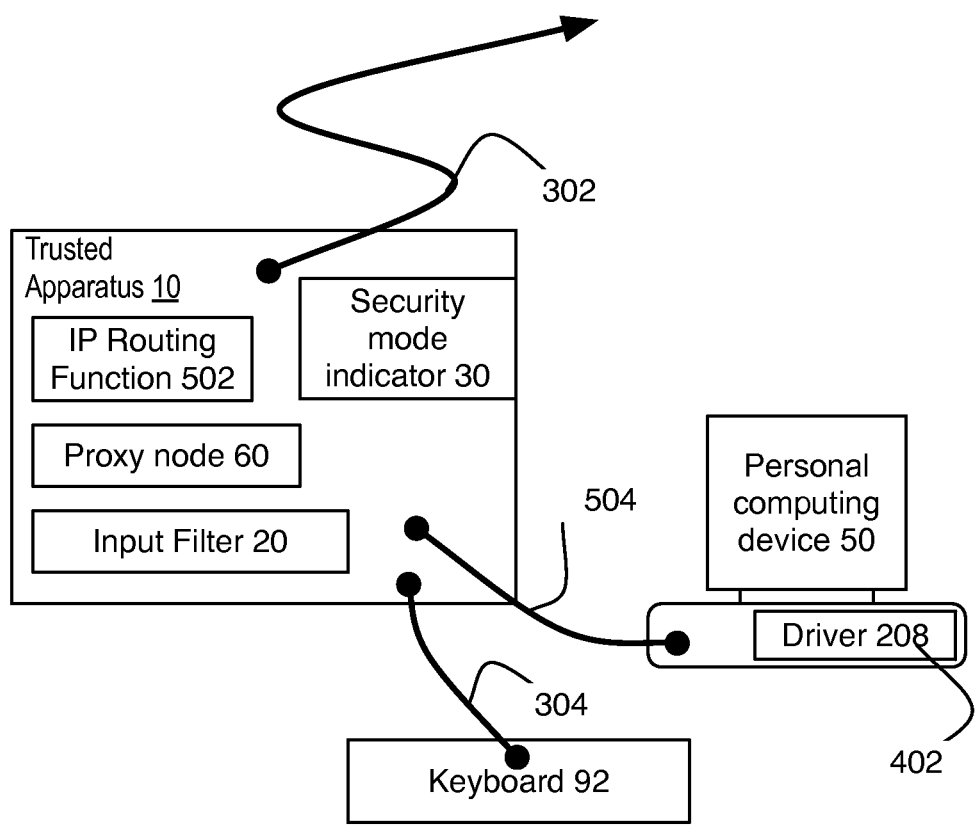

As shown in FIG. 18, a trusted apparatus enabled router may be employed. The trusted apparatus has integrated within it a wired or wireless Internet router function 502 for use in a Small-Office/Home-Office (i.e., SOHO) environment. In this configuration, keystrokes are relayed from a USB keyboard 92 via an Ethernet connection 504. The Driver Module 402 may be responsible for establishing a secured network connection with the correct trusted apparatus router 500 and keyboard 92.

Figure 19:
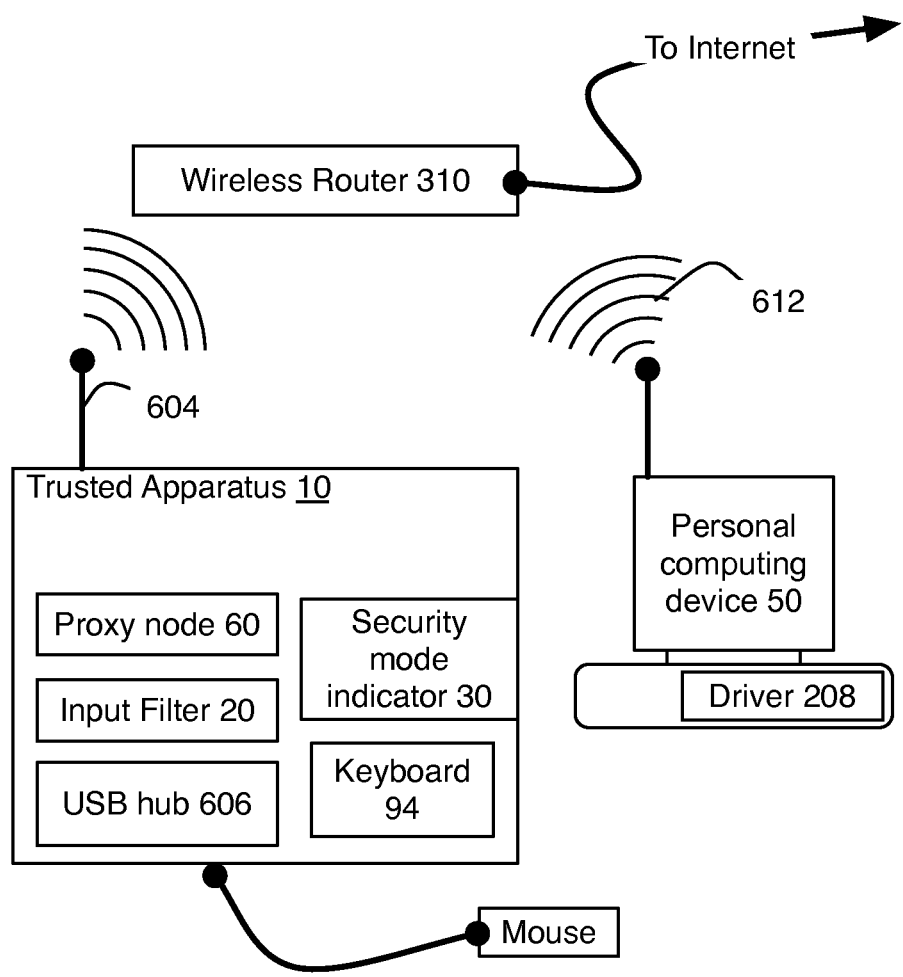
FIG. 19 shows the trusted apparatus including the proxy node and a keyboard, integrated to act as a wireless keyboard.

As shown in FIG. 19, the trusted apparatus lends itself readily to a wireless keyboard application. The trusted apparatus incorporates with the wireless keyboard 602 the Input filter 20, the Proxy node 60 and the Status Light 202. Keystrokes are relayed to the Driver Module 402 over a wireless Ethernet connection 604. The Driver Module 402 may be responsible for establishing a secured, wireless network connection with the correct trusted apparatus wireless keyboard 602. This integrated device includes a USB hub 606 in order to support peripherals, for example, to a mouse 608 by means of USB connection, or a FLASH disk, or even a biometric scanner. The Personal computing device 50 has a wireless connection 612.

Figure 20:
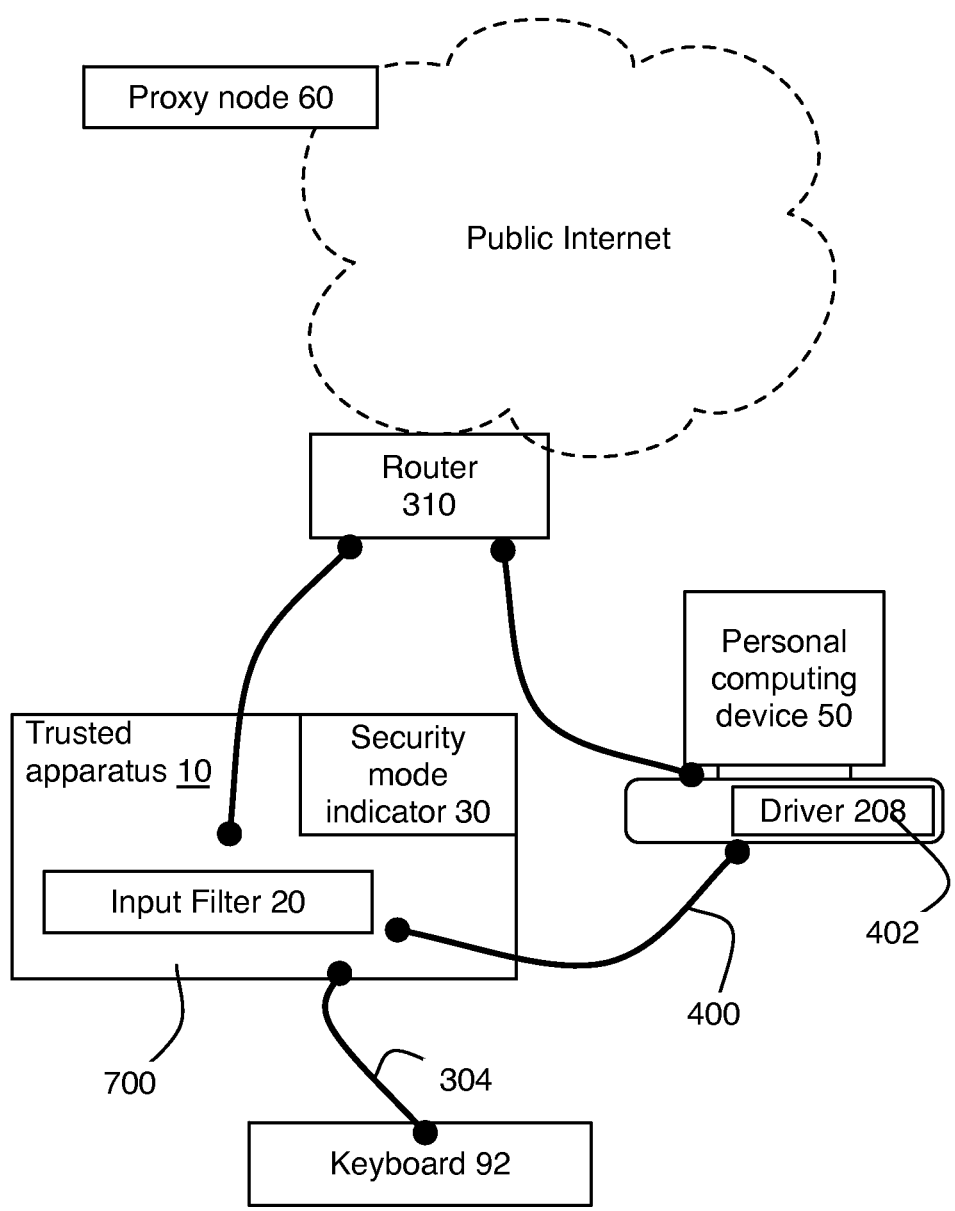
FIG. 20 shows a version of the components of FIG. 1.

The final configuration of FIG. 20 moves the Proxy node 60 function out of the end user's premises and onto a server in a hosting facility managed by some sponsoring organization. Recall that the Proxy node 60 and Input filter 20 communicate over a secure network protocol, and thus they need not be physically co-located. Moving the Proxy node 60 out of the trusted apparatus dongle 700 may be attractive for several reasons. First, the computational requirements of the device are significantly reduced, which in turn reduces its cost, size, and power requirements. Second, the filtering algorithm implemented by the Proxy node 60 may now be modified for different applications. It should be noted that the software embedded in the dongle may be by design not field-upgradeable. If the software were field-upgradeable, then rogue versions of the Proxy node or Input filter could be installed on it.

Turning to FIG. 20, the previous trusted apparatus 10 may be divided into two parts: trusted apparatus 10 and proxy node 60.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

The preceding embodiments provide examples of the invention and are not meant to constrain the scope of the following claims.

What is claimed is:

1. A trusted apparatus, comprising:
hardware adapted to implement:
at least one input filter and a security mode indicator, each configured to respond to a security mode signal, wherein said security mode indicator is further configured to report when said security mode signal indicates security mode asserted or security mode unasserted;
a security mode controller configured to provide said security mode signal to said at least one input filter and said security mode indicator;
wherein said at least one input filter further comprises:
at least one input coupling configured to couple to at least one user input device and receive at least one input symbol from said at least one user input device;
a personal device interface configured to provide a surrogate input to a personal computing device in response to said at least one input filter receiving a field request from a browser operating on said personal computing device and in further response to said security mode signal indicating security mode asserted, wherein said at least one input symbol is based upon said field request; and
a secure channel interface configured to provide an intended recipient of a network communication with at least one authentic input, said at least one authentic input based upon said at least one input symbol, when said security mode signal indicates security mode asserted and in further response to said at least one input filter receiving said field request;
wherein said at least one input filter is further configured to generate said surrogate input based upon said at least one input symbol and is further configured to alter said surrogate input in order to avoid recognition of said input symbol by said personal computing device, and wherein said surrogate input is provided to said personal computing device in place of said authentic input; and
wherein said trusted apparatus is configured to never provide said authentic input to said personal computing device when said security mode signal indicates security mode asserted.

2. The trusted apparatus of claim 1, wherein said at least one user input device includes a keyboard.

3. The trusted apparatus of claim 1, further comprising a second input filter configured to couple to a second user input device.

4. The trusted apparatus of claim 3, further comprising said second user input device.

5. The trusted apparatus of claim 1, further comprising at least one of:
said personal device interface configured to communicatively couple with said personal computing device; and
said secure channel interface configured to communicatively couple with said intended recipient of a network communication.

6. The trusted apparatus of claim 5, further comprising at least one of:
said personal device interface including a wireless interface;
said secure channel interface including a wireless interface; and
a wireless router.

7. A trusted apparatus, comprising:
hardware adapted to implement:
a security mode controller configured to provide a security mode signal, wherein said security mode signal indicates security mode asserted or security mode unasserted;
an input filter and a user input device coupled to said input filter;
a proxy node coupled to said input filter, said proxy node configured to:
receive an authentic input from said input filter,
communicate with an intended recipient of a network communication and with a personal computing device,
respond to said security mode signal when said security mode signal indicates security mode asserted or security mode unasserted,
respond to a web page request from said personal computing device to receive a web page including a field from said intended recipient of a network communication,
send said personal computing device a web page version including a tagged field replacing said field in response to receipt of said web page, and
respond to receiving said authentic input by sending an authentic response comprising said authentic input to said intended recipient of a network communication;
said input filter configured to:
respond to said security mode signal when said security mode signal indicates security mode asserted or security mode unasserted,
send said authentic input to said proxy node in response to receiving an input symbol from said user input device and when said security mode signal indicates security mode asserted, wherein said authentic input is based upon said input symbol, and
provide a surrogate input, in place of said authentic input, to said personal computing device in response to receiving said input symbol from said user input device, wherein said surrogate input is altered from said input symbol to avoid recognition of said input symbol by said personal computing device;

wherein said trusted apparatus is configured to never provide said authentic input to said personal computing device when said security mode signal indicates security mode asserted.

8. The trusted apparatus of claim 7, wherein said user input device includes a keyboard.

9. The trusted apparatus of claim 1, further comprising a second input filter configured to couple to a second user input device.

10. The trusted apparatus of claim 9, further comprising said second user input device.

11. The trusted apparatus of claim 7, further comprising at least one of:
- a personal device interface configured to communicatively couple with said personal computing device; and
- a secure channel interface configured to communicatively couple with said intended recipient of a network communication.

12. The trusted apparatus of claim 11, further comprising at least one of:
- said personal device interface including a wireless interface;
- said secure channel interface including a wireless interface; and
- a wireless router.

* * * * *